(12) United States Patent
Oddsen, Jr. et al.

(10) Patent No.: US 7,540,457 B2
(45) Date of Patent: Jun. 2, 2009

(54) ANGLED MINI ARM HAVING A CLEVIS ASSEMBLY

(75) Inventors: Odd N. Oddsen, Jr., Easton, PA (US); Bradley A. Derry, Allentown, PA (US)

(73) Assignee: Innovative Office Products, Inc., Easton, PA (US)

( * ) Notice: Subject to any disclaimer, the term of this patent is extended or adjusted under 35 U.S.C. 154(b) by 384 days.

(21) Appl. No.: 11/141,348

(22) Filed: May 31, 2005

(65) Prior Publication Data

US 2006/0266909 A1   Nov. 30, 2006

(51) Int. Cl.
*E04G 3/00* (2006.01)
(52) U.S. Cl. ............... 248/278.1; 248/921; 248/922
(58) Field of Classification Search .......... 248/278.1, 248/282.1, 276.1, 285.1, 917–919, 921–923
See application file for complete search history.

(56) References Cited

U.S. PATENT DOCUMENTS

| | | | |
|---|---|---|---|
| 999,283 | A | 8/1911 | White |
| D275,431 | S | 9/1984 | Usab |
| 4,836,486 | A | 6/1989 | Vossoughi et al. |
| 4,953,822 | A * | 9/1990 | Sharber et al. ......... 248/281.11 |
| D324,863 | S | 3/1992 | Timm |
| 5,092,552 | A | 3/1992 | Dayton et al. |
| 5,379,205 | A | 1/1995 | Peng et al. |
| D363,065 | S | 10/1995 | Karten et al. |
| 5,538,214 | A | 7/1996 | Sinila |
| D383,376 | S | 9/1997 | Vogels et al. |
| 5,975,472 | A | 11/1999 | Hung et al. |
| 6,012,693 | A | 1/2000 | Voeller et al. |
| D422,482 | S | 4/2000 | Csik et al. |
| 6,076,785 | A | 6/2000 | Oddsen, Jr. |
| 6,409,134 | B1 | 6/2002 | Oddsen, Jr. |
| 6,478,274 | B1 | 11/2002 | Oddsen, Jr. |
| 6,505,988 | B1 | 1/2003 | Oddsen, Jr. |

(Continued)

FOREIGN PATENT DOCUMENTS

DE    200 18 361    4/2001

(Continued)

OTHER PUBLICATIONS

"Ergonomic mounting solutions for monitors and keyboards," Product Catalog—LCD Arms & Mounts, retrieved from internet Feb. 15, 2005, <URL:\\www.lcdarms.com/pdfs/Innovative_Product_Catalog.pdf> © 2004, Innovative Office Products, 18 pgs.

(Continued)

*Primary Examiner*—Korie H. Chan
*Assistant Examiner*—Steven Marsh
(74) *Attorney, Agent, or Firm*—Design IP

(57) ABSTRACT

The present invention provides an extension arm apparatus with angled clevis operation to provide enhanced mechanical leverage. The clevis adjusts along a path angled relative to an axis of the device, which significantly boosts performance and can reduce the size of the apparatus. Upper and lower channels of the device taper from a first width to a second width, providing a sleek and functional apparatus that can be used with heavy monitors, displays or other user equipment. When a forearm extension attached to an endcap of the apparatus, an interlocking washer and shaft configuration prevents the forearm extension-endcap connection from loosening during operation.

20 Claims, 38 Drawing Sheets

U.S. PATENT DOCUMENTS

| | | |
|---|---|---|
| 6,592,090 B1 * | 7/2003 | Li .................... 248/284.1 |
| 6,695,270 B1 | 2/2004 | Smed |
| 6,695,274 B1 * | 2/2004 | Chiu ..................... 248/371 |
| D489,370 S | 5/2004 | Jobs et al. |
| 6,758,454 B2 | 7/2004 | Smed |
| D494,183 S | 8/2004 | Wills et al. |
| 6,854,698 B2 | 2/2005 | Oddsen, Jr. |
| 6,896,230 B2 * | 5/2005 | Cvek .................. 248/276.1 |
| 2002/0066843 A1 * | 6/2002 | Oddsen et al. ........ 248/282.1 |
| 2003/0146359 A1 | 8/2003 | Oddsen |
| 2004/0031893 A1 | 2/2004 | Smed |
| 2004/0084587 A1 * | 5/2004 | Oddsen ................ 248/284.1 |
| 2004/0222344 A1 | 11/2004 | Oddsen |
| 2004/0251389 A1 | 12/2004 | Oddsen, Jr. |
| 2005/0230585 A1 | 10/2005 | Hung |

FOREIGN PATENT DOCUMENTS

| | | |
|---|---|---|
| EP | 0 050 079 | 4/1982 |
| GB | 2 416 062 | 1/2006 |
| WO | WO-92/13749 | 8/1992 |

OTHER PUBLICATIONS

U.S. Appl. No. 10/885,854, filed Jul. 7, 2004, entitled "Arm Apparatus With Reinforcement."

U.S. Appl. No. 11/058,820, filed Feb. 16, 2005, entitled "Quick Release Assembly for an Electronic Device."

* cited by examiner 7A-7A 16A-16A 16B-16B

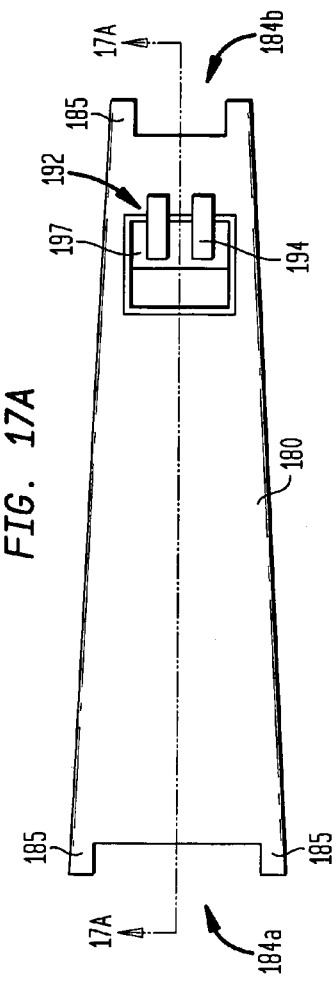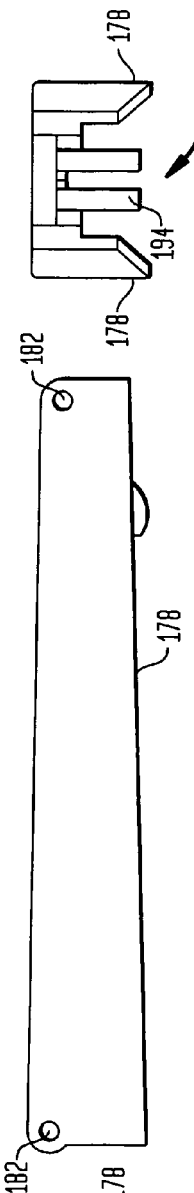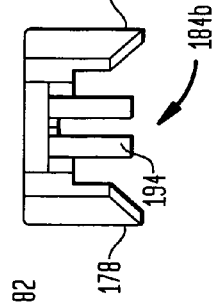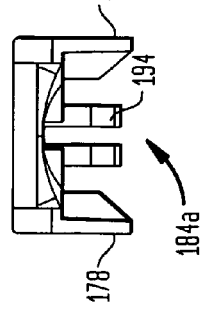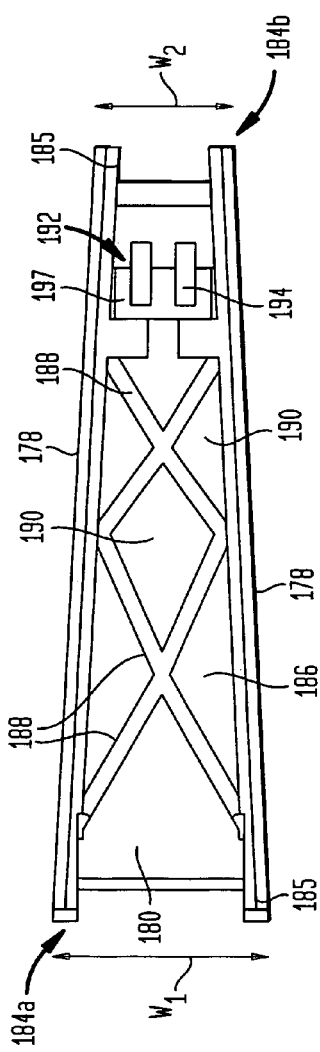

17A-17A

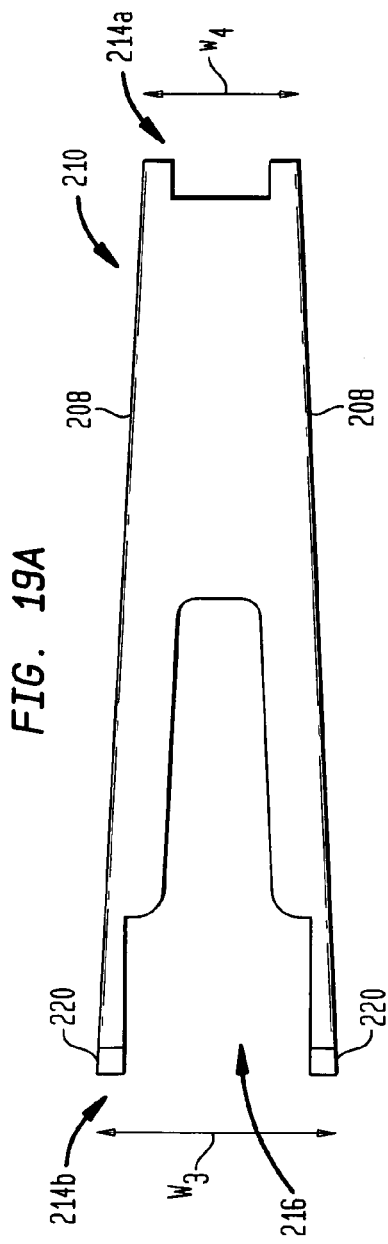 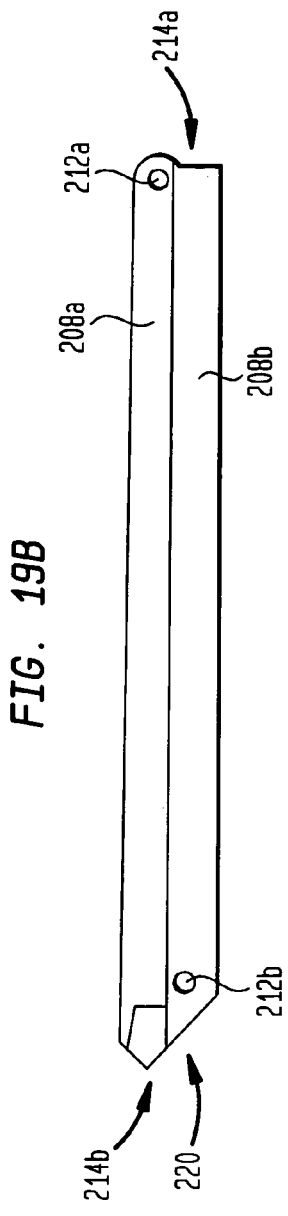 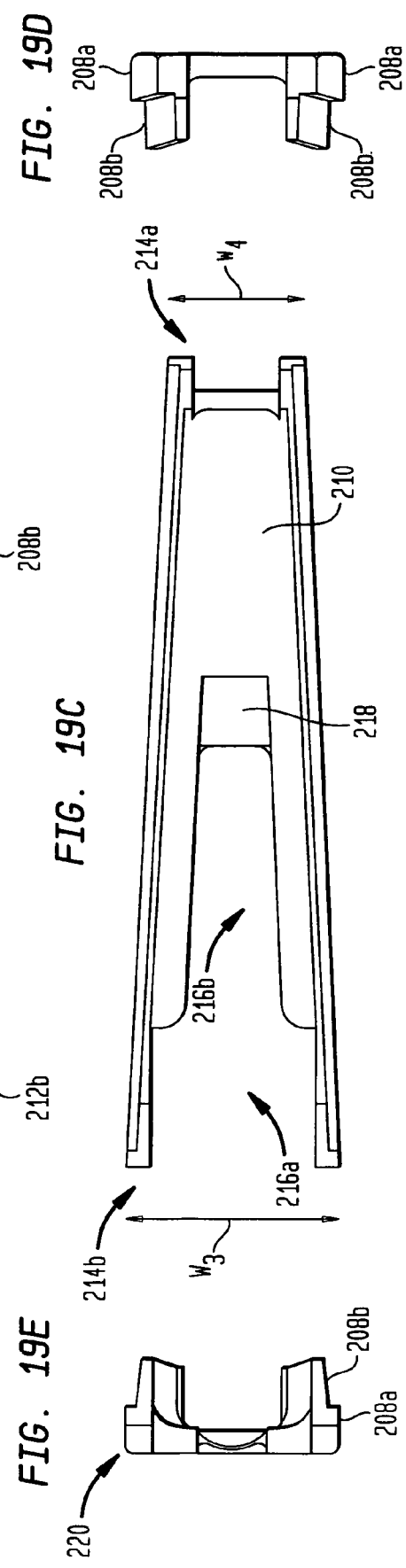

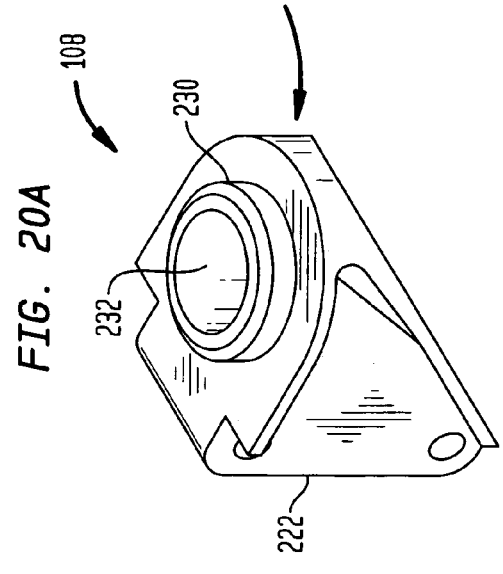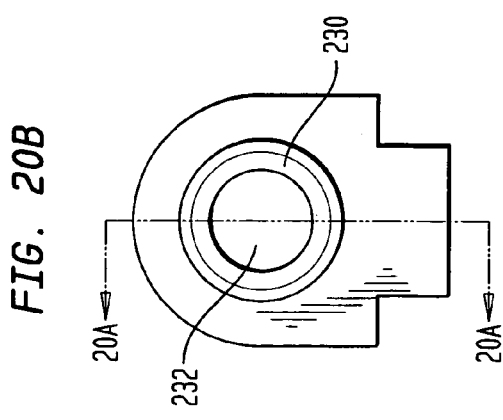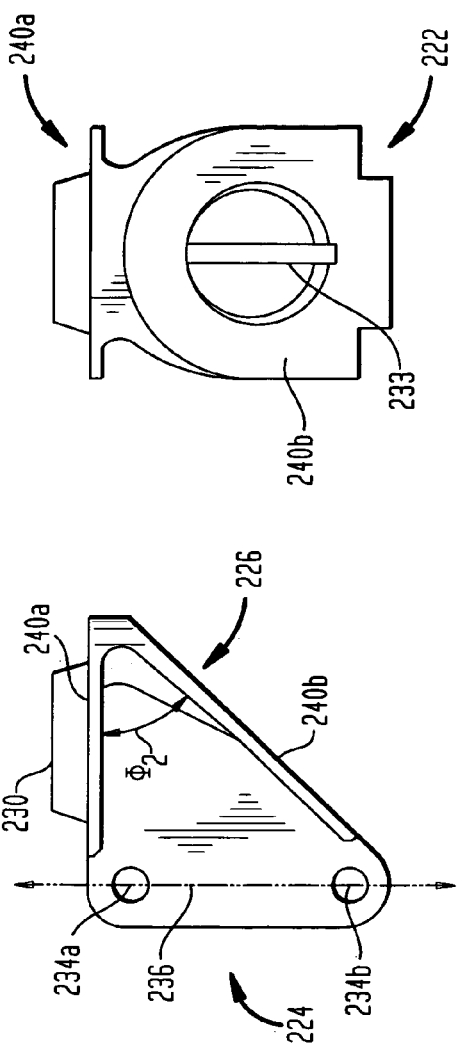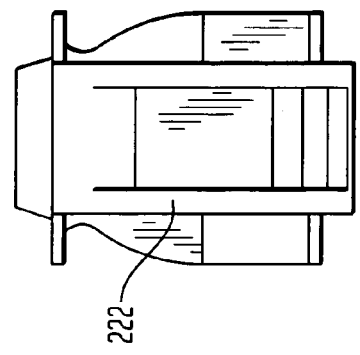

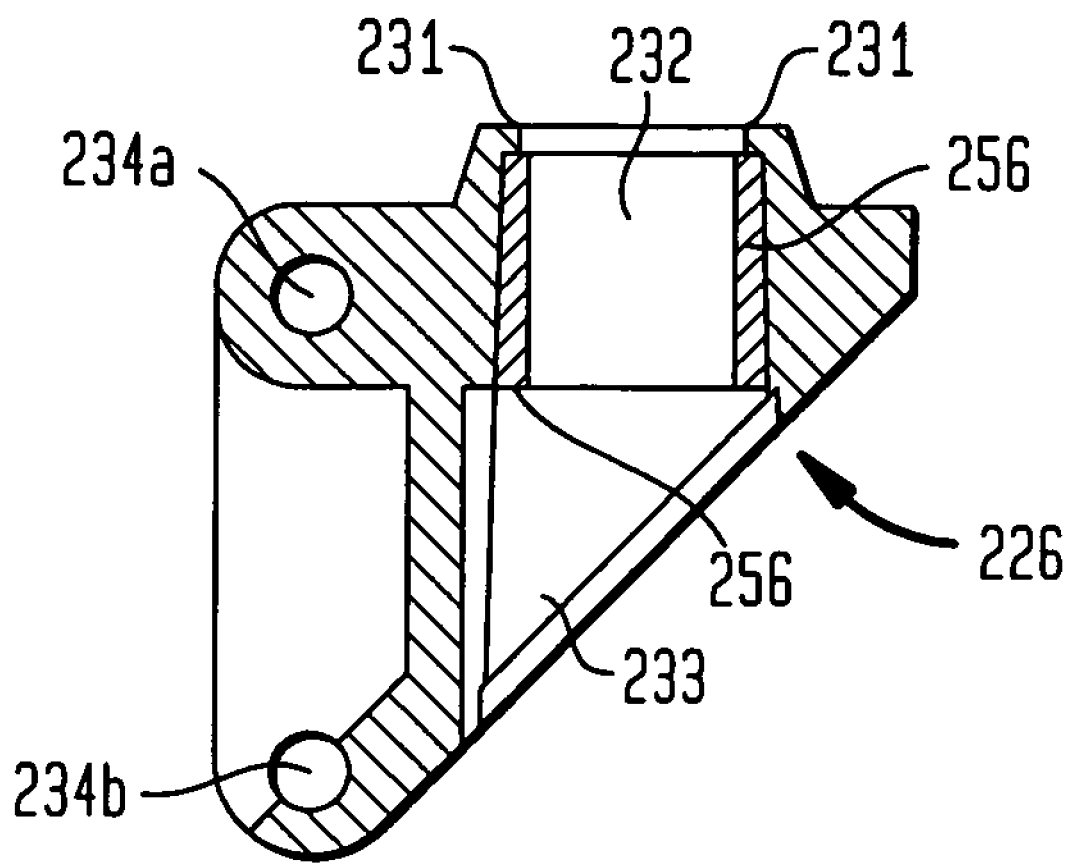

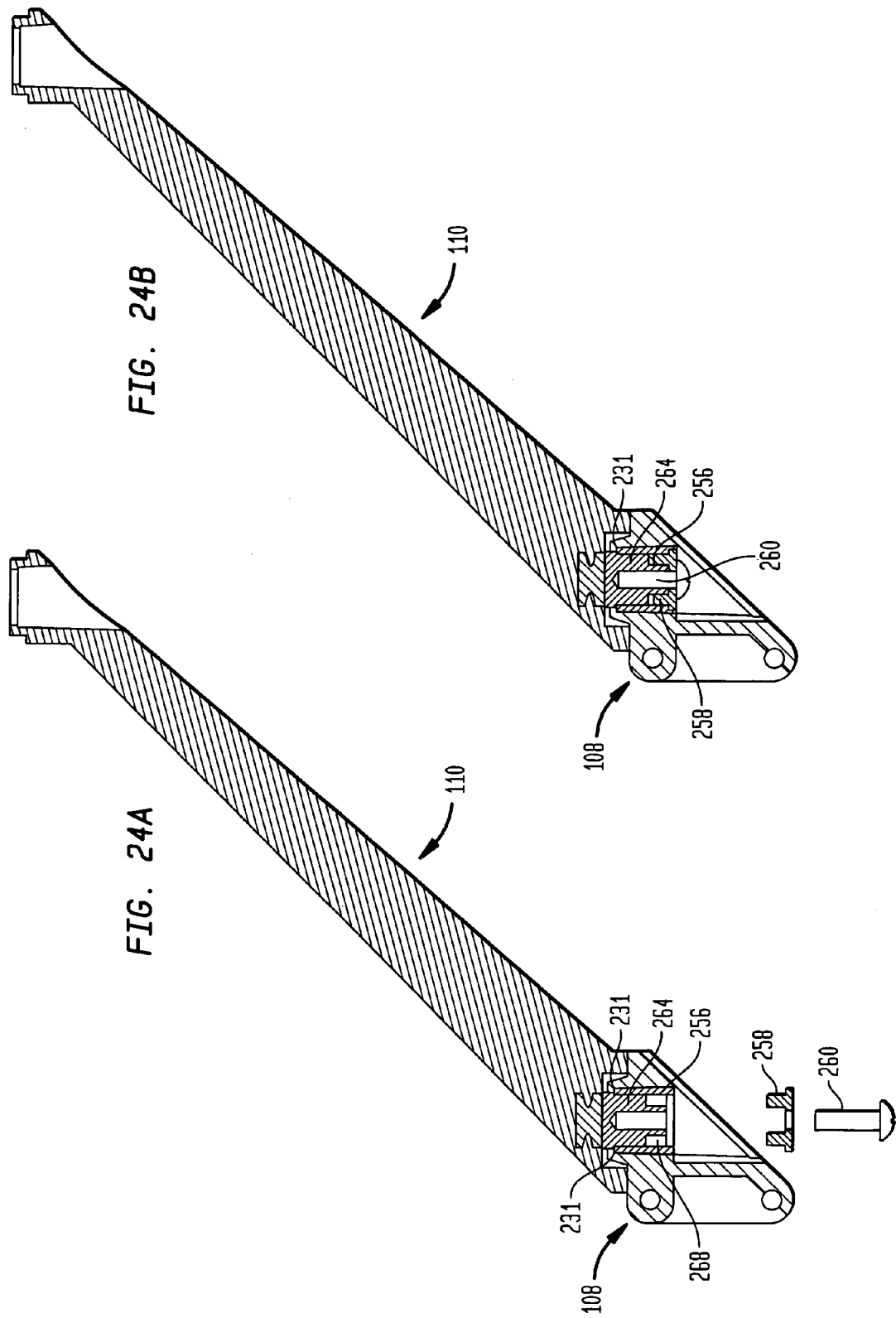

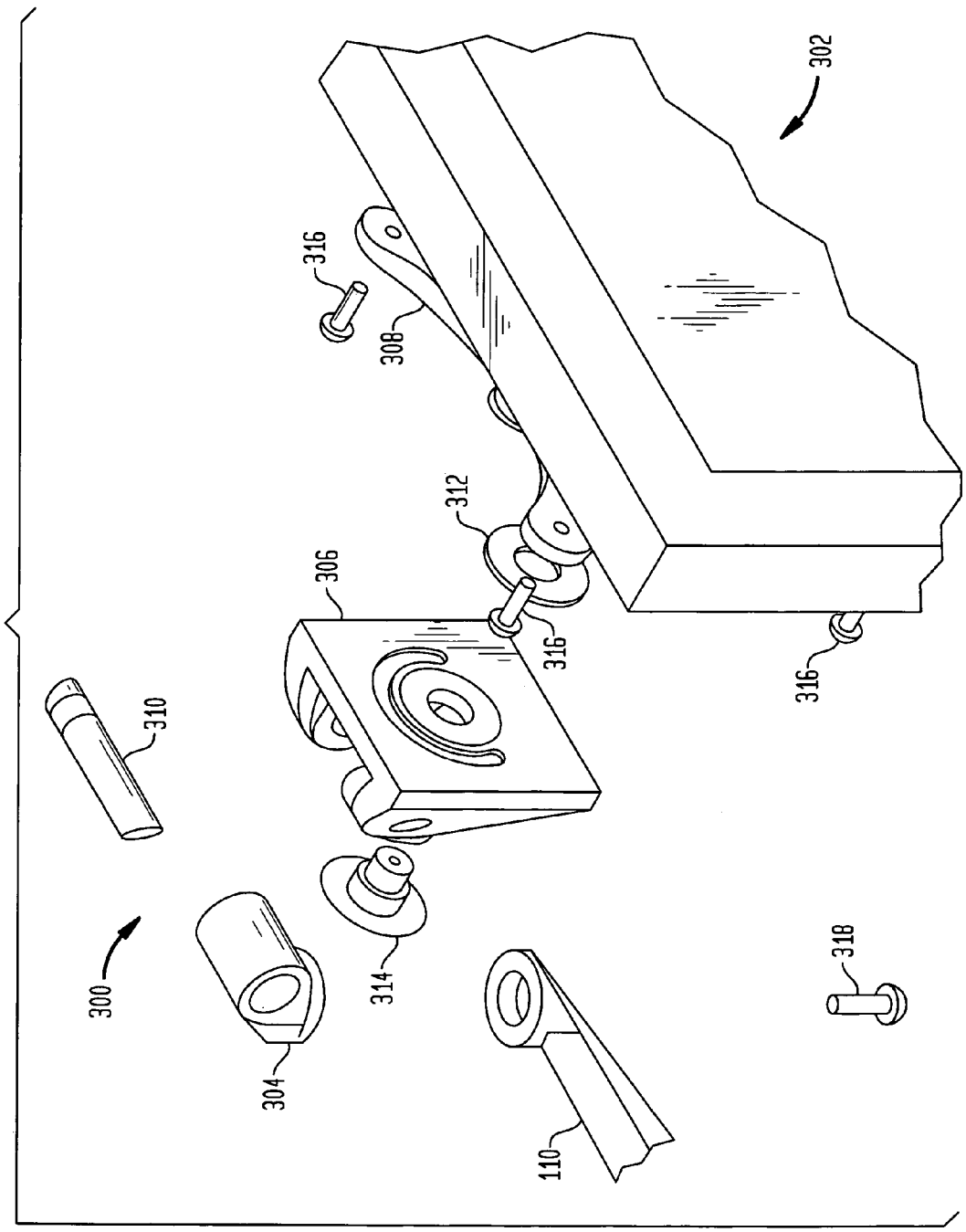

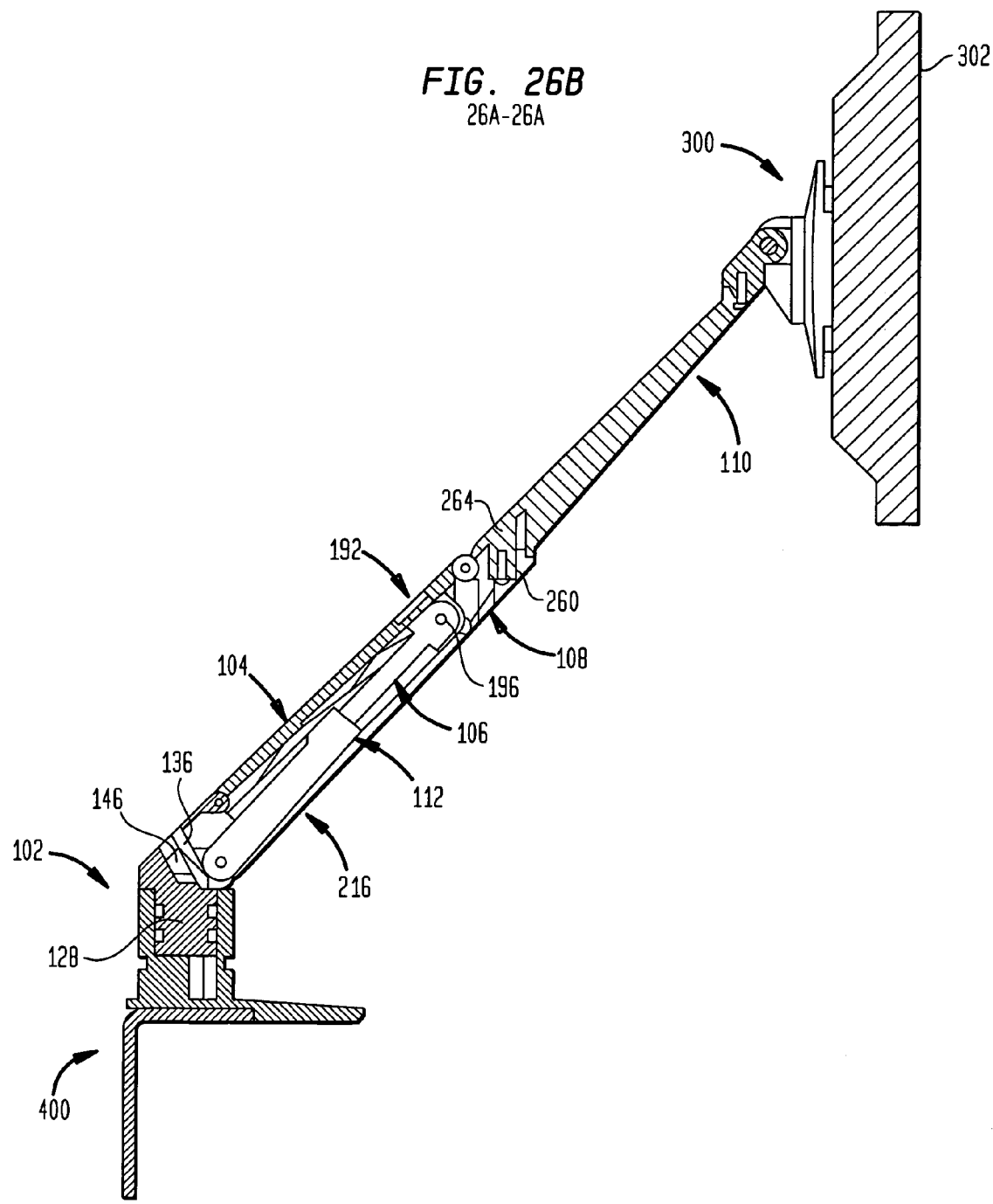

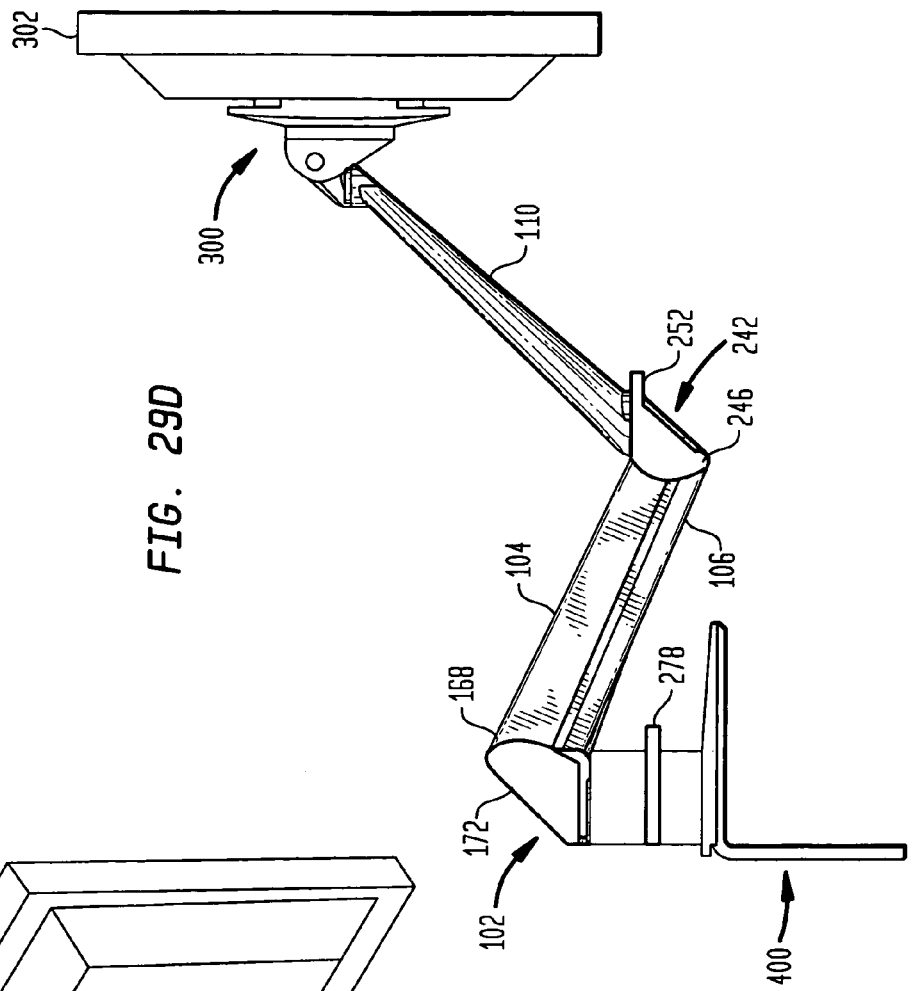
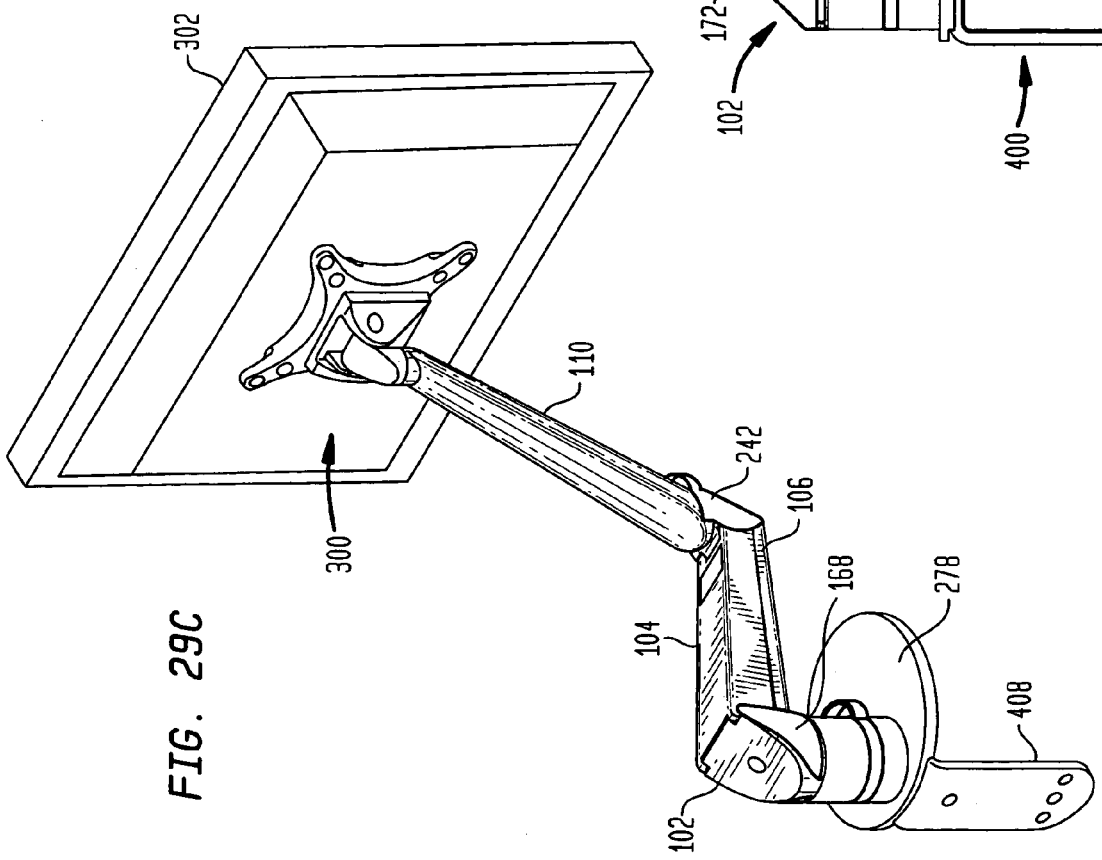

ANGLED MINI ARM HAVING A CLEVIS ASSEMBLY

CROSS-REFERENCE TO RELATED APPLICATION

This application is related to U.S. patent application Ser. No. 11/141,425, filed concurrently herewith and entitled "TAPERED MINI ARM HAVING AN ANTI-LOOSENING MECHANISM," the entire disclosure of which is hereby expressly incorporated by reference herein.

BACKGROUND OF THE INVENTION

The present invention relates to a device for use in connecting electronic and other user devices. More particularly, the present invention relates to compact and versatile extension arms on which electronic devices such as flat panel displays, keyboards, etc. can be mounted.

In the past people have placed video monitors and other electronic equipment on desks, tabletops, or upon other equipment such as personal computers or workstations. One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from poor placement of devices such as monitors and keyboards.

Different solutions have been provided in order to overcome these obstacles. For example, in one solution, a monitor stand or printer stand elevates the apparatus over other equipment on a desk. While this may free up workspace, it often places the equipment in an undesirable location. Another solution employs a mechanical extension arm to support the monitor. Extension arms free up workspace and allow users to place the equipment where it is wanted. One such extension arm is shown and described in U.S. Pat. No. 6,478,274, entitled "Arm Apparatus for Mounting Electronic Devices," which is fully incorporated by reference herein. Another type of extension arm is shown and described in U.S. Pat. No. 6,409,134, entitled "Arm Apparatus For Mounting Electronic Devices With Cable Management System," which is fully incorporated by reference herein.

It is often desirable to obtain additional freedom of movement beyond that provided by the extension arm. A tilting device can be used to accomplish this goal. The tilting device is placed between the extension arm and the equipment, allowing the equipment to rotate about one or more axes. One such tilting device is shown and described in U.S. Pat. No. 6,505,988, entitled "Tilter for Positioning Electronic Devices," which is fully incorporated by reference herein.

FIGS. 1-7 illustrate a known extension arm 10 for mounting an electronic device. As shown in FIG. 1, the main elements of the extension arm 10 are a first endcap 12, an upper channel 14, a lower channel 16, a second endcap 18, and a forearm extension 20. The first endcap 12 has an endcap shaft 22 that is pivotably attachable to a rigid support mount (not shown), such as an orifice sized to accept the endcap shaft 22 or a track configured and sized to engage the grooves on endcap shaft 22. The shaft 22 is rotatable about an axis 24. The first endcap 12 is pivotably coupled via pins 26 to both the upper channel 14 and the lower channel 16. The pins 26 extend through receptacles in the upper and lower channels and span the width of the first endcap 12. As seen in the figure, the pins 26 are vertically aligned along a line 28 that is parallel to the axis 24. The opposite ends of the upper channel 14 and the lower channel 16 are pivotably coupled via pins 26' to the second endcap 18. The forearm extension 20 is pivotably coupled to the second endcap 18 by the endcap shaft 22', which may be a hollow tubular member fixedly attached to the second endcap 18. The forearm extension 20 has a vertically disposed hole 30 therethrough for accepting a shaft 32 of a mounting device (not shown) such as a tilter, platform or other apparatus. The forearm extension 20 includes a hollow interior 34 so that a cable 36 of the mounted device can pass through the forearm extension 20. The cable 36 can extend through a hollow tubular member of the second endcap 18. The cable 36 can pass through a sheath or cover 38 attached to the lower channel 16. The hollow interior 34 and/or the sheath 38 hide the cable 36 from view.

The combination of the upper and the lower channels 14, 16 and the first and the second endcaps 12, 18 form an adjustable parallelogram that permits a device coupled to the forearm extension 20 to be raised and lowered to a desirable height. The parallelogram retains its position by employing an extension/retraction device such as a gas spring 40, which is pivotably and adjustably attached to the first endcap 12 and the upper channel 14, as will be further described below. Generally, the gas spring 40, e.g., a gas type hydraulic cylinder and a retractable piston rod, is sized so as to have a fixed length until an upward or downward force is exerted at the second endcap 18 that exceeds the gas spring's designed resistance. Thus, the gas spring 40 causes the parallelogram to retain its position when the only force exerted at the second endcap 18 is the weight of the device, but permits the parallelogram to be adjusted when a user pushes the device coupled to the forearm extension 20 up or down.

FIG. 2 illustrates a side view of the first endcap 12, having the endcap shaft 22 disposed on a first end 42 of the first endcap 12. To provide a rigid connection between the two pieces, the endcap shaft 22 is typically machined from steel and is inserted into the first end 42 during the casting process of the first endcap 12. The endcap shaft 22 has a hole 44 formed in an end of the endcap shaft 22 that is inserted into the first endcap 12. The first endcap 12 is typically fabricated from cast aluminum. The first endcap 12 also has a second end 46 having a hole 48 disposed therethrough. Disposed within the first endcap 12 is a threaded rod 50. A first end 52 of the threaded rod 50 is inserted into the hole 44 at the base of the endcap shaft 22. A second end 54 of the threaded rod 50 is aligned with the hole 48 and is held in place by a clip 56. The clip 56 is fastened to an inner surface of the first endcap 12 by screws 58. The threaded rod 50 is parallel to the line 28 and is typically aligned along the axis 24.

Threadedly mounted on the threaded rod 50 is a clevis 60. FIG. 3 illustrates a side view of the clevis 60 including a tapped hole 62 in the center thereof. The tapped hole 62 receives the threaded rod 50, as shown in FIG. 2. At a first end of the clevis 60 is a pair of fastening members 64, 66 to which is fastened one end of the gas spring 40. A second end 68 of the clevis 60 is configured to slideably engage a track 70 which is integrally molded in the first endcap 12 (see FIG. 2). The second end 54 of the threaded rod 50 is configured to be engaged by a hex-shaped key, which is inserted through the hole 48 when the second end 54 is properly aligned with the hole 48. The hex-shaped key is employed so as to rotate the threaded rod 50 along its axis of rotation. When the threaded rod 50 is rotated along its axis of rotation, the clevis 60 moves along the length of the threaded rod 50 in a direction that corresponds to the direction which the hex-shaped key is turned. This movement of the clevis 60 permits the gas spring 40 to be adjusted. Specifically, the clevis 60 moves up or down along the track 70 in a path parallel to the line 28.

FIGS. 4A and 4B illustrate the upper channel 14, which comprises channel bottom 72 from which extend two channel sidewalls 74. Channel bottom 72 and sidewalls 74 are typically stamped from 13 gauge steel sheet in order to give the upper channel 14 a desired degree of structural rigidity. At each of the ends of the channel bottom 72, a semi-circular region 76 of the sidewalls 74 is cut out to accommodate cold-rolled steel rollers 78, which have a hole 79 therethrough for receiving the pins 26 or 26'. The rollers 78 are rigidly attached to the upper channel 14 by MIG welding along the edge of the semi-circular cut out region 76 and along the ends of the channel bottom 72. Alternatively, the rollers 78 are integrally cast with the exterior of the upper channel 14 during fabrication.

Additionally, the upper channel 14 comprises stiffener 80, which is welded to an inner surface of the channel bottom 72. Besides providing additional structural rigidity to the upper channel 14, the stiffener 80 has a hole disposed at one end with a threaded ball stud 82 placed within the hole and fixed in place by a nut 84. The ball stud 82 is configured and sized to receive one end of the gas spring 40. The longitudinal centerline 85 of the upper channel 14 is illustrated in FIG. 4B. FIGS. 4C and 4D illustrate an alternative upper channel 14'. The upper channel 14' is constructed to optionally include internal reinforcements. This is particularly advantageous when mounting heavy electronic devices to the extension arm, for example, large computer monitors of the CRT type. Internal within the upper channel 14' is a rib assembly including a plurality of cross-ribs 86 and angularly disposed secondary ribs 87. By way of example, the cross-ribs 86 are disposed transverse to the sidewalls 74, while the secondary ribs 87 are disposed at an angle so as to form a triangular internal support structure. The cross-ribs 86 and secondary ribs 87 may be formed as an integral member which can be inserted into the upper channel 14'. The cross-ribs 86 and secondary ribs 87 can be integrally cast during formation of the upper channel 14'.

FIGS. 5A and 5B illustrate the lower channel 16, which comprises a channel bottom 88 from which extend two channel sidewalls 90. As with the upper channel 14, the channel bottom 88 and sidewalls 90 are typically stamped from 13 gauge steel sheet, which is relatively heavy in order to give the lower channel 16 a desired degree of structural rigidity. At opposite ends of the channel bottom 88, a semi-circular region 91 of the sidewalls 90 is cut out to accommodate cold-rolled steel rollers 92, which have a hole 93 therethrough for receiving the pins 26 or 26'. The rollers 92 are rigidly attached to the lower channel 16 by MIG welding along the edge of the semi-circular cut out region 91 and along the ends of the channel bottom 88. Alternatively, the rollers 92 are integrally cast with the exterior of the lower channel 16 during fabrication. The longitudinal centerline 94 of the lower channel 16 is illustrated on FIG. 5B.

FIG. 6 illustrates a variant of the second endcap 18 of FIG. 1. Unlike the first endcap 12, the second endcap 18 does not have a clevis assembly for attachment to the gas spring 40. The alternative second endcap 18 shown in FIG. 6 omits the endcap shaft 22' for receiving the forearm extension 20, as illustrated in FIG. 1. Instead, the endcap 18 may include hole 95 at one end for receiving a shaft of the forearm extension 20. The endcap 18 may also include hole 96 for receiving a set screw (not shown) to prevent rotation of the forearm extension 20 about the endcap 18.

FIG. 7A illustrates the forearm extension 20 having a central arm 31 and first and second ends 33, 35, respectively, attached to the central arm 31. The first end 33 includes an opening 37 for connection with the endcap shaft 22' of the second endcap 18. The second end 35 includes the opening 30 for receiving the shaft of the device mount. An opening 39 is provided for access to the interior 34. As seen in the cutaway view of FIG. 7B along the A-A line, there is, access to the opening 37 of the first end 33 via region 41, which allows the cable 36 to be hidden from view.

Known extension arms, such as those in FIGS. 1-7, may operate satisfactorily, but may not be well suited for sleeker, more compact designs. Reducing the size of some components can, if not correctly engineered, adversely impact equipment performance. By was of example only, an extension arm may be made smaller by reducing the dimensions of the upper and lower channels. Such a modification would necessitate reducing size of the gas spring. Unfortunately, if the overall structure of the extension arm remains the same as the size is reduced, a smaller gas spring typically cannot handle the load of a large device, and, in turn, cannot support larger monitors or other equipment. In addition, some of the connection between components, such as the connection between the forearm extension 20 and the second endcap 18, can become loose, for example after repeatedly adjusting or rotating the forearm extension 20. Loose connections could potentially lead to hazardous conditions. Therefore, a need exists for new extension arm designs to address these and other concerns.

SUMMARY OF THE INVENTION

In accordance with an embodiment of the present invention, an adjustable support apparatus is provided. The apparatus comprises first and second endcaps, first and second channels, and a clevis assembly. The first endcap has a first section for connecting to a mount, a second section connected to the first section, and a clevis receiving member connected to one or both of the first and second sections. The first endcap also has a longitudinal axis therealong. The second endcap has first and second sections. The first section of the second endcap supports a user device and the second section is connected to the first section of the second endcap. The first channel has first and second ends. The first end of the first channel is connected to the second section of the first endcap. The second end of the first channel is connected to the second section of the second endcap. The second channel has first and second ends. The first end of the second channel is connected to the second section of the first endcap. The second end of the second channel is connected to the second section of the second endcap. The clevis assembly includes a clevis in operative engagement with the clevis receiving member of the first endcap and with a spring member coupled to the first channel. The clevis is adjustable along the clevis receiving member at a predetermined angle relative to the axis of the first endcap to change a compression state of the spring member.

In one alternative, the clevis assembly further comprises a rod in threaded engagement with the clevis. The rod is positioned at the predetermined angle relative to the axis of the first endcap. In another alternative, the predetermined angle is between 10° and 80°. In a further alternative, the predetermined angle is between about 45° to 70°. In yet another alternative, the first endcap includes a housing connecting the first and second sections. In this case, the clevis receiving member is disposed along an interior sidewall of the housing. The clevis receiving member includes a surface having the predetermined angle sloping from the second section to the first section.

In another alternative, the adjustable support apparatus further includes a first fastener having a first length and a pair of second fasteners each having a second length shorter than the first length. The first end of the first channel connects to the second section of the first endcap with the first fastener and the first end of the second channel connects to the second section of the first endcap with the pair of second fasteners. In this case, the first endcap preferably includes a housing connecting the first and second sections. Here, the housing includes a pair of reinforcing members to support the pair of second fasteners therein.

In a further alternative, the adjustable support apparatus further comprises at least one endcap cover. Here, the first endcap further includes a flange member connected to the first and second sections. The at least one endcap cover is adapted to be placed adjacent to the flange member and cover a portion of the first endcap. In another alternative, the first channel further includes an integrally molded connector having an angled receiving member for securing the spring member to the first channel. In this case, the adjustable support apparatus desirably further comprises a retaining cover connectable to the first channel. The spring member is secured to the first channel between the retaining cover and the angled receiving member. In another alternative, the first channel further includes a reinforcement structure therein.

In accordance with another embodiment of the present invention, an adjustable support apparatus is provided. The apparatus comprises first and second endcaps and first and second channels. The first endcap has first and second ends and a longitudinal axis from the first end to the second end. The second end includes means for mounting the adjustable support apparatus to a surface. The second endcap has means for supporting a user device. The first channel has first and second ends. The first end of the first channel is connected to the first end of the first endcap, and the second end of the first channel is connected to the second endcap. The second channel has first and second ends. The first end of the second channel is connected to the first end of the first endcap, and the second end of the second channel is connected to the second endcap. The first and second channels define a cavity for containing a spring mechanism therein. The adjustable support apparatus also includes means for adjusting the spring mechanism. The adjusting means is moveable along a path at a predetermined angle relative to the axis of the first endcap.

In accordance with yet another embodiment of the present invention, an adjustment assembly for adjustably supporting a device with an extension and retraction mechanism is provided. The adjustment assembly comprises a housing, a clevis and a channel apparatus. The housing has a longitudinal axis therealong and a track positioned at an angle relative to the longitudinal axis. The clevis has first and second ends. The first end has a surface for engaging the track and the second end has an opening therein for connecting to the extension and retraction mechanism at a first end thereof. The channel apparatus has a first end connected to the housing and a second end connected to a second end of the extension and retraction mechanism. The clevis is adjustable along the track to change positioning of the extension and retraction mechanism.

In one alternative, the adjustment assembly further comprises a rod and a retaining plate. The rod threadedly adjusts the clevis along the track. The rod having a head at one end thereof, a tip remote from the head, and a threaded section disposed between the head and the tip. The retaining plate secures the rod to an edge of the housing. The edge of the housing and the retaining plate including mating recesses defining a receptacle for receiving the tip of the rod therein.

In one example, the clevis includes bottom and top surfaces that are substantially parallel to one another, and the opening of the clevis is positioned at a height at a midpoint between the bottom and top surfaces. In another example, the clevis includes bottom and top surfaces that are substantially parallel to one another, and the opening of the clevis is positioned at a height above a midpoint between the bottom and top surfaces. Here, the second end of the clevis is preferably angled upward. In a further example, the clevis includes bottom and top surfaces that are substantially parallel to one another, and the opening of the clevis is positioned at a height below a midpoint between the bottom and top surfaces. In this case, the second end of the clevis is preferably angled downward.

In an alternative, the second end of the clevis includes a pair of spaced apart fastening members and the opening comprises a pair of aligned opening. A first one of the openings is positioned in a first one of the fastening members and a second one of the openings is positioned in the second one of the fastening members. The clevis includes a receptacle for threadedly adjusting the clevis along the track. The angle of the track is a first angle relative to the longitudinal axis and the receptacle is positioned at a second angle relative to the longitudinal axis. The first and second angles may be substantially equal.

In accordance with yet another embodiment of the present invention, an adjustable extension arm is provided. The adjustable extension arm comprises first and second channel members and first and second endcaps. The first channel member has a first end, a second end opposite the first end, and a pair of sidewalls extending from the first end to the second end. The pair of sidewalls of the first channel member taper from a first width at the first end thereof to a second width at the second end thereof. The second channel member has a first end, a second end opposite the first end, and a pair of sidewalls extending from the first end to the second end. The pair of sidewalls of the second channel member taper from a third width at the first end thereof to a fourth width at the second end thereof. The sidewalls of the first and second channel members at least partly receive a spring member therebetween. The first endcap has first and second sections. The first section is coupled to the first channel member about the first end thereof and to the second channel member about the first end thereof. The second endcap has first and second sections. The first section of the second endcap is coupled to the first channel member about the second end thereof and to the second channel member about the second end thereof.

In one alternative, the third width is substantially equal to the first width and the fourth width is substantially equal to the second width. In another alternative, the tapering of the sidewalls of the first and second channel members is substantially uniform and continuous from the first ends to the second ends.

In a further alternative, the sidewalls of the second channel member each comprise a stepped sidewall each having first and second sections. The first section of each stepped sidewall is recessed relative to the second section thereof. In this case, the first channel member preferably includes a pair of planar sidewalls having inner surfaces in operative communication with outer surfaces of the first sections of the stepped sidewalls. Here, the inner surfaces of the planar sidewalls are desirably spaced apart from the outer surfaces of the first sections of the stepped sidewalls so that the planar sidewalls are moveable relative to the stepped sidewalls during adjustment of the adjustable extension arm.

In another alternative, the second channel member includes a cover having an open region near the first endcap and the spring member at least partly protrudes through the open region.

In accordance with another embodiment of the present invention, an extension arm apparatus for supporting a user device is provided. The apparatus comprises first and second endcaps, first and second channels, and a forearm assembly. The first endcap has a first section for connection to a mount and a second section connected to the first section thereof. The second endcap also has first and second sections. The first channel has first and second ends. The first end of the first channel is connected to the second section of the first endcap and the second end of the first channel is connected to the first section of the second endcap. The second channel has first and second ends. The first end of the second channel is connected to the second section of the first endcap and the second end of the second channel is connected to the first section of the second endcap. The first and second channels defining a receptacle for a spring device. The forearm assembly includes an anti-loosening apparatus and a forearm extension. The forearm extension has a first end operatively coupled to the second section of the second endcap and a second end for supporting the user device. The anti-loosening apparatus permits rotation of the forearm extension relative to the second endcap while preventing loosening between the forearm extension and the second endcap during rotation.

In one alternative, the second section of the second endcap includes a receptacle having an opening therein, the first end of the forearm extension includes a shaft and at least one recess disposed in the shaft, the shaft is at least partly received within the opening in the second section of the second endcap, and the forearm assembly further comprises a washer and a fastener. The washer has at least one protrusion adapted to be received within the at least one recess to connect the washer to the shaft. The fastener secures the second section of the second endcap, the washer and the shaft together so that the shaft is rotatable relative to the second section of the second endcap.

In this case, the fastener is preferably threadedly secured to the shaft, and the connection between the washer and the shaft prevents the fastener from loosening during movement of the forearm extension. In an alternative, the forearm assembly further comprises a bushing positioned in the opening of the receptacle to at least partly surround the shaft. In another alternative, the forearm assembly further comprises an outer washer disposed between an exterior surface of the forearm extension and an exterior surface of the receptacle. In yet another alternative, the at least one recess comprises a pair of recesses disposed along an outer surface of the shaft. Here, the at least one protrusion of the washer comprises a pair of protrusions adapted to be received within the pair of recesses.

In a further alternative, the first channel tapers from a first width at the first end thereof to a second width at the second end thereof, the second channel tapers from a third width at the first end thereof to a fourth width at the second end thereof, and the forearm extension tapers from a fifth width at a first end adjacent to the second endcap to a sixth width at a second end remote from the second endcap. In this case, the third width is preferably substantially equal to the first width and the fourth width is preferably substantially equal to the second width.

In accordance with a further embodiment of the present invention, an extension arm apparatus for supporting a user device is provided. The apparatus comprises first and second endcaps, first and second channels and a forearm extension. The first endcap has means for mounting to a surface. The first channel has first and second ends. The first end of the first channel is connected to the first endcap and the second end of the first channel is connected to the second endcap. The second channel has first and second ends. The first end of the second channel is connected to the first endcap and the second end of the second channel is connected to the second endcap. The forearm extension has first and second ends. The first end of the forearm extension is operatively coupled to the second endcap. The second end of the forearm extension is operatively coupled to the user device. The apparatus further includes means for preventing loosening between the forearm extension and the second endcap.

In accordance with yet another embodiment of the present invention, an extension arm apparatus for positioning a user device is provided. The apparatus comprises first and second housings, a channel assembly, a supporting device and a connection assembly. The first housing is used to secure the extension arm apparatus to a support. The second housing is remote from the first housing and includes a receptacle therein. The channel assembly connects the first and second housings and is adjustable to change positioning of the extension arm apparatus. The supporting device is connectable to the user device and includes a first connecting member on a surface thereof. The connection assembly is used for connecting the supporting device to the second housing. The connection assembly includes a washer and a fastener. The washer has an opening therethrough and a second connecting member on a first surface thereof. The second connecting member secures to the first connecting member of the supporting device. The fastener is insertable through the opening of the washer and the receptacle of the second housing to threadedly engage the supporting device. The supporting device is rotatable about the second housing while the first and second connecting members prevent loosening of the supporting device relative to the second housing.

In one alternative, the supporting device includes a shaft having the first connecting member. The receptacle of the second housing includes a lip. In this case, the extension arm apparatus further comprises a bushing disposed around the shaft. The bushing is retained within the receptacle of the second housing between the lip and the washer. In another alternative, the supporting device comprises a forearm extension. In a further alternative, the supporting device comprises a tilting device.

BRIEF DESCRIPTION OF THE DRAWINGS

FIGS. 17A-F illustrate an upper channel in accordance with a preferred embodiment of the present invention.

FIGS. 19A-E illustrate a lower channel in accordance with a preferred embodiment of the present invention.

FIGS. 20A-F illustrate an endcap in accordance with a preferred embodiment of the present invention.

FIGS. 24A-B illustrate the forearm assembly of FIGS. 22A-B connected to an endcap in accordance with a preferred embodiment of the present invention.

FIGS. 25A-B illustrates an exploded view of a tilting device for use with the present invention.

FIGS. 26A-B illustrate an extension arm connected to a display device in accordance with aspects of the present invention.

FIGS. 29A-F illustrate selected positioning of an extension arm in accordance with aspects of the present invention.

DETAILED DESCRIPTION

In describing the preferred embodiments of the invention illustrated in the appended drawings, specific terminology will be used for the sake of clarity. However, the invention is not intended to be limited to the specific terms used, and it is to be understood that each specific term includes all technical equivalents that operate in a similar manner to accomplish a similar purpose.

Figure 8:
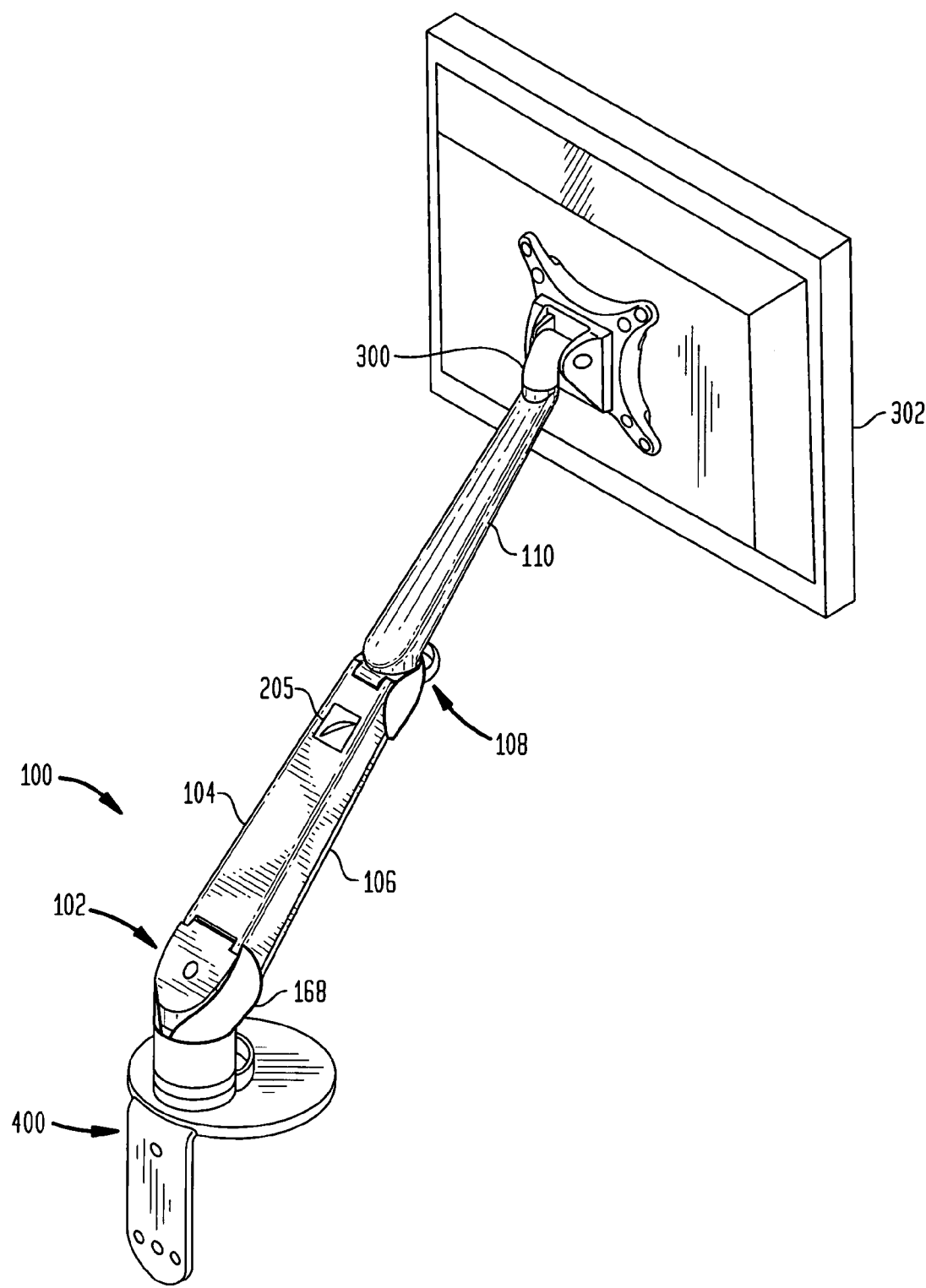
FIG. 8 illustrates an assembled extension arm in accordance with a preferred embodiment of the present invention.

FIG. 8 illustrates an extension arm 100 in accordance with a preferred embodiment of the present invention. The extension arm 100 is connectable at one end to a mounting assembly 400 and attachable to a tilting device 300 at the other end. The mounting assembly 400 may be of any desired configuration, and may be affixed to a piece of furniture such as a desk, a wall such as a slat wall, a section of an office cubicle, etc. The tilting apparatus 300 is connectable to a user device 302 such as a flat panel monitor, although other electronic or non-electronic devices may connect to the tilting apparatus 300. Alternatively, the user device 302 may directly connect to the extension arm 100.

Figure 9:
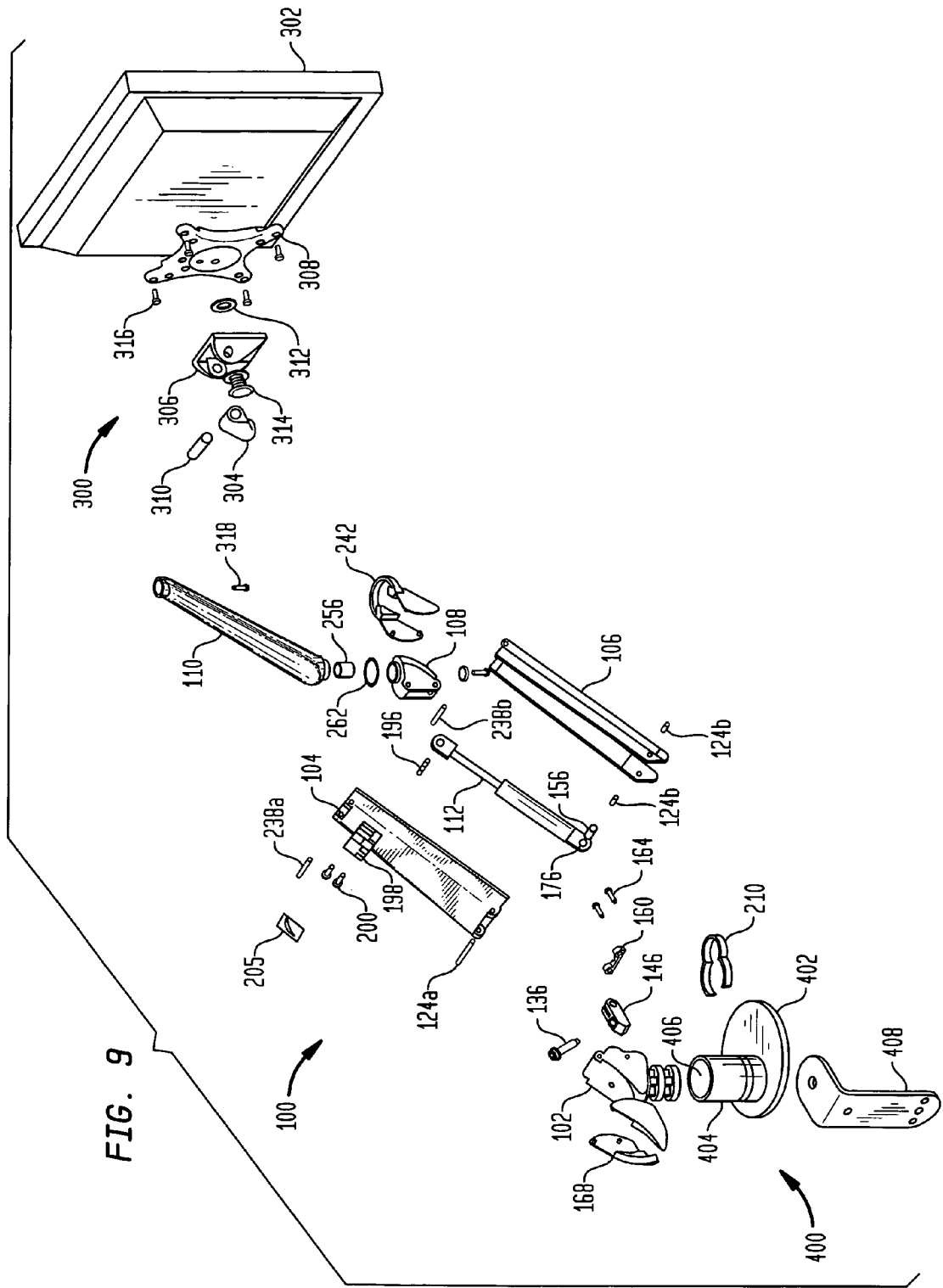
FIG. 9 illustrates an exploded view of the extension arm of FIG. 8.

FIG. 9 illustrates an exploded view of the extension arm 100. As shown in the figure, the extension arm 100 preferably includes a first endcap 102, an upper channel 104, a lower channel 106, a second endcap 108, and a forearm extension 110. An extension and retraction device, such as a gas spring 112, permits the extension arm 100 to be adjusted and to retain a selected configuration. One end of the gas spring 112 preferably connects to the upper channel 104 and the other end connects to the first endcap 102, as will be described below. The gas spring 112 may be equivalent to the conventional gas spring 28 discussed above. However, as will be discussed below, the gas spring 112 may be operated in a manner different than in the extension arm 10. The components of the extension arm 100 will now be discussed in detail.

FIGS. 10A-F illustrate views of the first endcap 102. As seen in the perspective view of FIG. 10A, the first endcap 102 includes a housing 114, which is adapted to attach to one end of the upper channel 104 and the lower channel 106 by, for example, pins. The housing 114 preferably includes a first or bottom end 116, a second or top end 118, and a sidewall 120 connecting the first end 116 and the second end 118. The second end 118 is shown as being angled relative to the first end 116, although this is not required. The sidewall 120 is preferably generally U-shaped or C-shaped and open along one side thereof.

The first endcap 102 includes axis 121. Depending upon the configuration of the first endcap 102, it may or may not be rotatable about the axis 121. The axis 121 is shown as a central, longitudinal axis 121 running through the approximate center of the first endcap 102. Preferably, the first endcap 102 includes pairs of upper and lower holes 122*a,b*, respectively, disposed on the sidewall 120. As best seen in FIG. 10C, the upper and lower holes 122*a,b*, are preferably vertically aligned along a line or axis 123 that is parallel to the axis 121. Alternatively, the upper and lower holes 122*a,b* may not be vertically aligned, and the line 123 may be angled relative to the axis 121.

The housing 114 desirably attaches to the upper channel 104 by means of a single elongated pin 124*a* and to the lower channel 106 by means of a pair of short pins 124*b*. See FIG. 9. The elongated pin 124*a* should extend at least the width of the housing 114 and engage the upper channel 104. The short pins 124*b* preferably extend less than half the width of the housing 114 and each engages a part of the lower channel 106. It is also possible to attach the endcap 102 to the lower channel 106 with an elongated pin such as the elongated pin 124*a*. However, in this case full extension and freedom of movement of the extension arm 100 may not be fully realized, as a full-size elongated pin could impinge upon the movement of the gas spring 112.

Figure 10A:
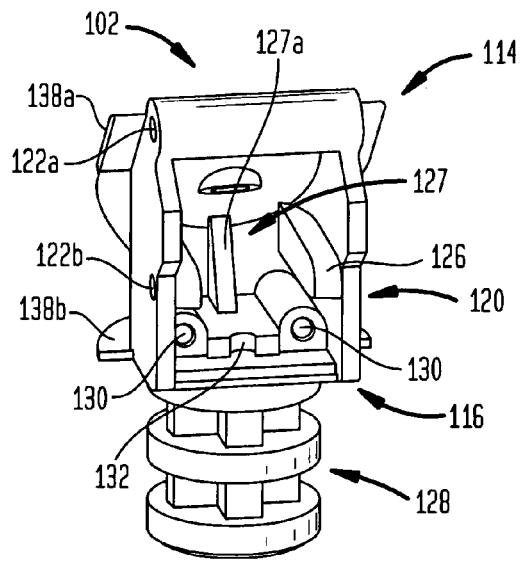
FIGS. 10A-F illustrate a preferred embodiment of an endcap in accordance with aspects of the present invention.
Figure 10D:
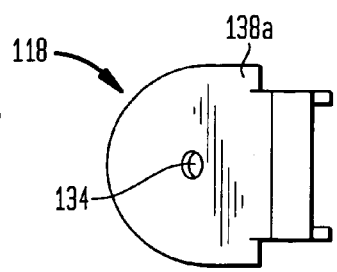
Figure 10B:
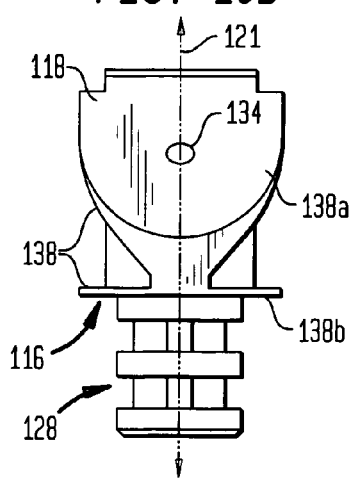
Figure 10C:
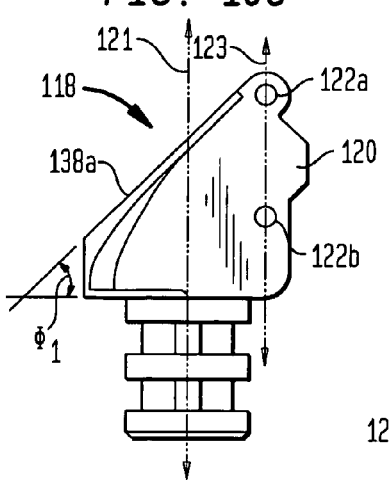
Figure 10F:
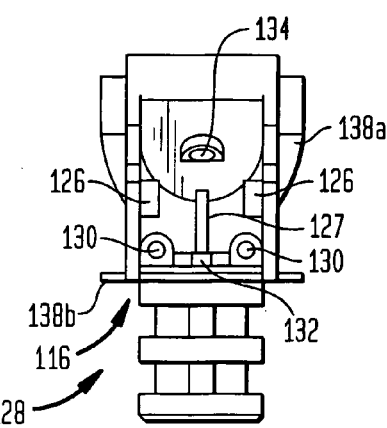
Figure 10E:
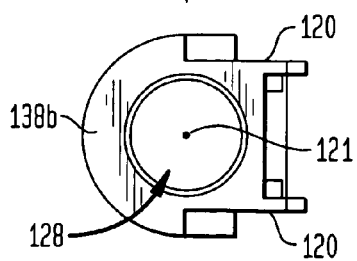

As best seen in FIGS. 10A and 10F, interior portions of the sidewall 120 preferably include reinforcing members 126 facing one another. The reinforcing members 126 are positioned in line with the lower holes 122*b*. Preferably, the lower holes 122*b* extend substantially into or completely through the reinforcing members 126, which provides additional depth to receive the short pins 124*b*. The reinforcing members 126 may be positioned on the sidewall only adjacent to the lower holes 122*b*, or may extend as shown toward the rear of the sidewall 120 adjacent to the top end 118.

Also shown in FIGS. 10A and 10F is a track or clevis receiving member 127, which is preferably positioned along the rear of the sidewall 120 between the reinforcing members 126. The track 127 is desirably integral with the sidewall 120 and may extend up from the first end 116 to the second end 118. The track 127 may be formed in the shape of a triangle and preferably includes an angled surface 127*a* which slopes from the second end 118 to the first end 116. The angled surface 127*a* is at an angle (i.e., non-parallel) relative to the axis 121 and preferably, relative to the line 123. The purpose of the angled surface 127*a* will be explained in detail below with regard to the clevis assembly.

As seen in FIGS. 10A-C and 10E-F, a shaft 128 or other connection device may be disposed on the first end 116 of the housing 114. The shaft 128 is preferably adapted for connection to the mounting assembly 400. The shaft 128 may be integrally molded with the first end 116 of the housing 114. Alternatively, the shaft 128 may be securely attached to the housing 114 of the first endcap 102. The shaft 128 is preferably integral with the first endcap 102.

As seen in FIGS. 10A and 10F, the housing 114 of the first endcap 102 preferably includes a pair of holes or openings 130 disposed at or near the first end 116 of the housing 114. A recess 132 may be positioned between the holes 130 and in line with the track or clevis receiving member 127. The holes 130 and the recess 132 can be used when attaching the clevis assembly to the first endcap 102, as will be explained below.

As best seen in FIGS. 10B, D and F, the second end 118 of the housing 114 preferably includes a hole 134 disposed therethrough. The hole 134 is adapted to receive a threaded rod 136 (see FIGS. 11A-C) that is part of the clevis assembly. The exterior of the housing 114 may also include a flange member 138 having an upper flange 138a disposed on or integral with the second end 118 and a lower flange 138b disposed on or integral with the first end 116. The upper and lower flanges 138a,b are positioned at an angle $\Phi_1$ relative to one another.

Figure 11A:
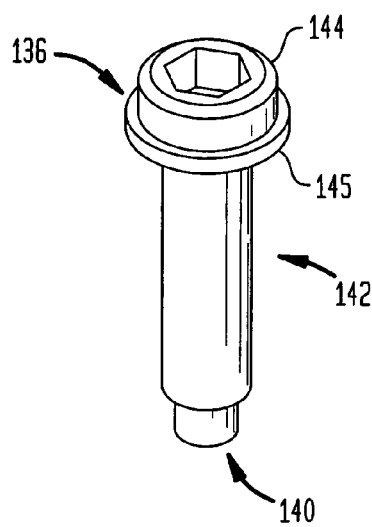
FIGS. 11A-C illustrate a fastener in accordance with an aspect of the present invention.
Figure 11C:
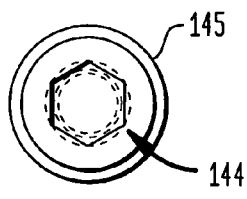
Figure 11B:
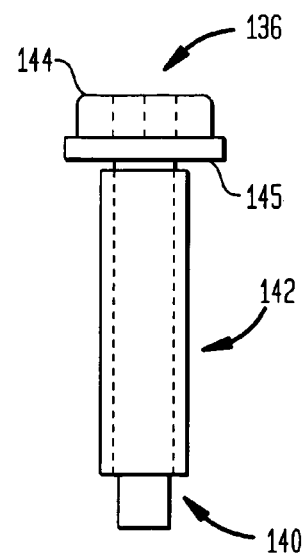

FIGS. 11A-C illustrate the threaded rod 136 in more detail. The threaded rod 136 includes a tip 140, a threaded portion 142 and a head 144 having a flange 145. The head 144 is preferably positioned so that it is accessible through the hole 134 in the second end 118 of the housing 114.

Figure 12A:
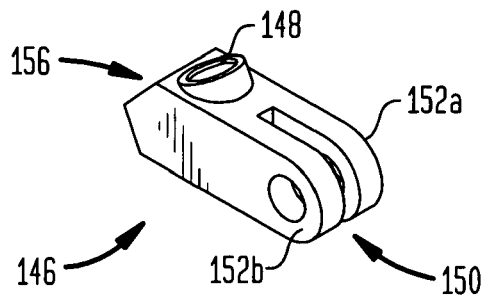
FIGS. 12A-P illustrate preferred embodiments of a clevis in accordance with aspects of the present invention.
Figure 12B:
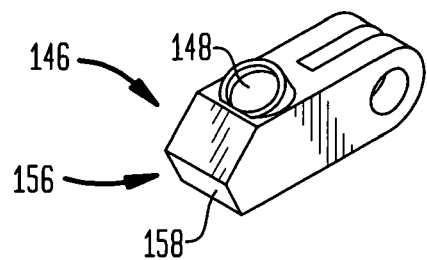
Figure 12C:
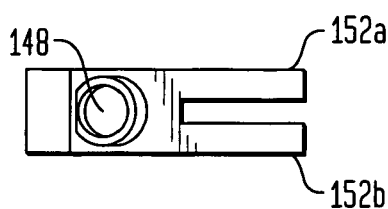
Figure 12E:
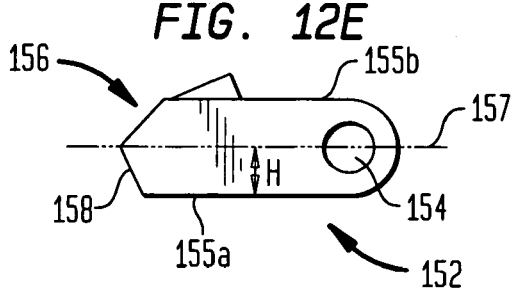
Figure 12D:
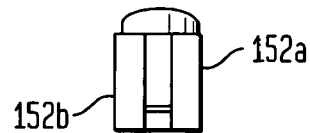

The rod 136 threadedly engages a clevis 146. FIGS. 12A-H illustrate a preferred embodiment of the clevis 146 in detail. FIGS. 12A-B illustrate perspective views of the clevis 146, where it can be seen to include a threaded hole 148 therein. The hole 148 threadedly receives the threaded rod 136. As seen in the top view of FIG. 12C and the front view of FIG. 12D, a first end 150 of the clevis 146 preferably includes a pair of spaced apart fastening members 152a,b. As seen in the side view of FIG. 12E, the fastening members 152a,b include aligned openings 154 therein. The openings 154 are positioned at a height H relative to the bottom of the clevis 146. In this embodiment, the openings 154 are positioned approximately halfway between the base 155a and the top 155b of the clevis 146, along a center line 157. One end of the gas spring 112 is fastened to the fastening members 152a,b via a gas spring pin 156 or other fastener received by the openings 154 (see FIG. 16D).

Figure 12F:
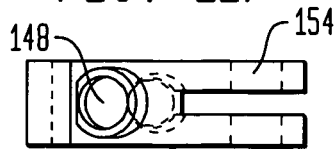
Figure 12G:
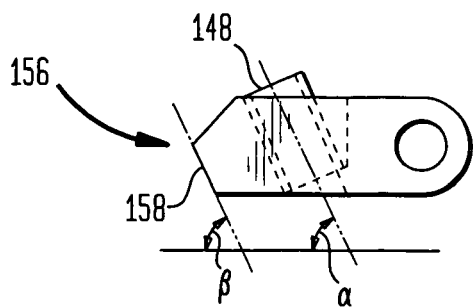
Figure 12H:
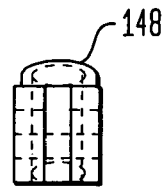
Figure 12J:
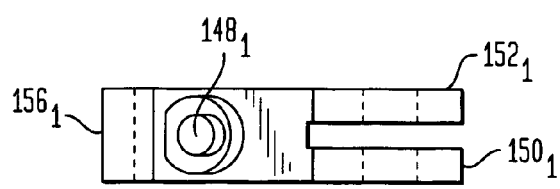
Figure 12I:
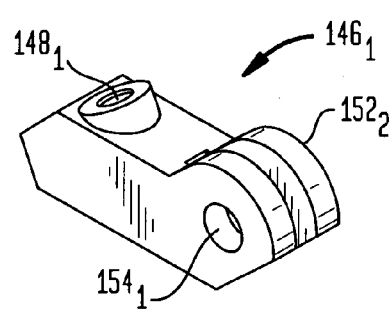
Figure 12K:
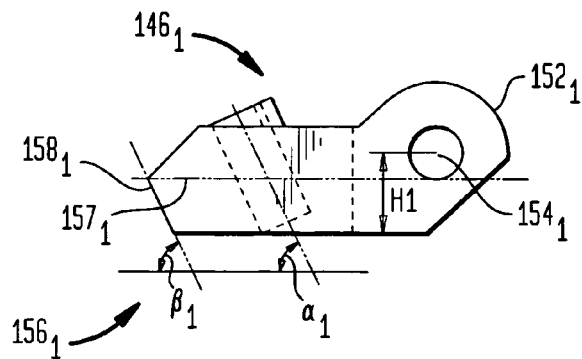
Figure 12L:
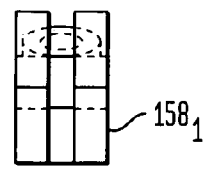
Figure 12N:
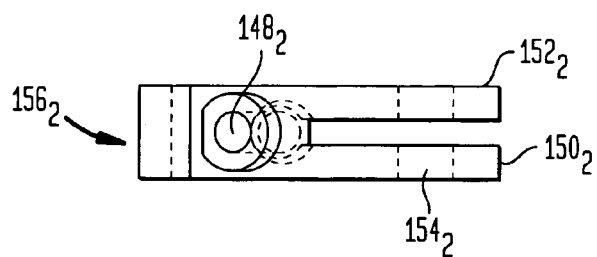
Figure 12M:
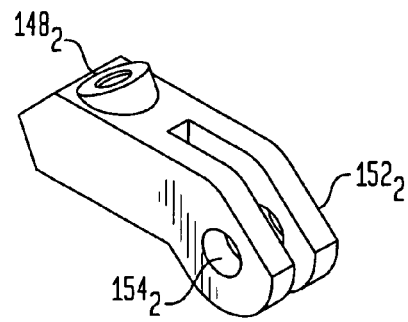
Figure 12O:
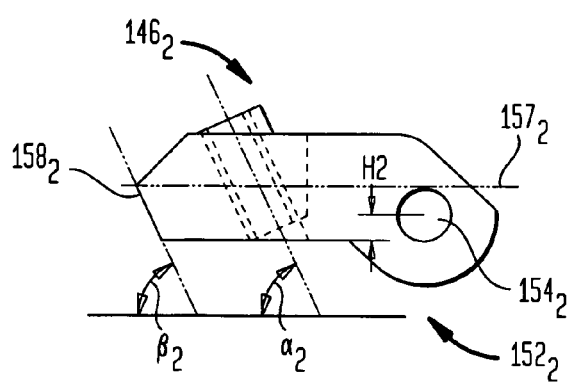
Figure 12P:
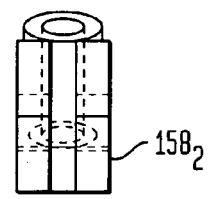
Figure 14A:
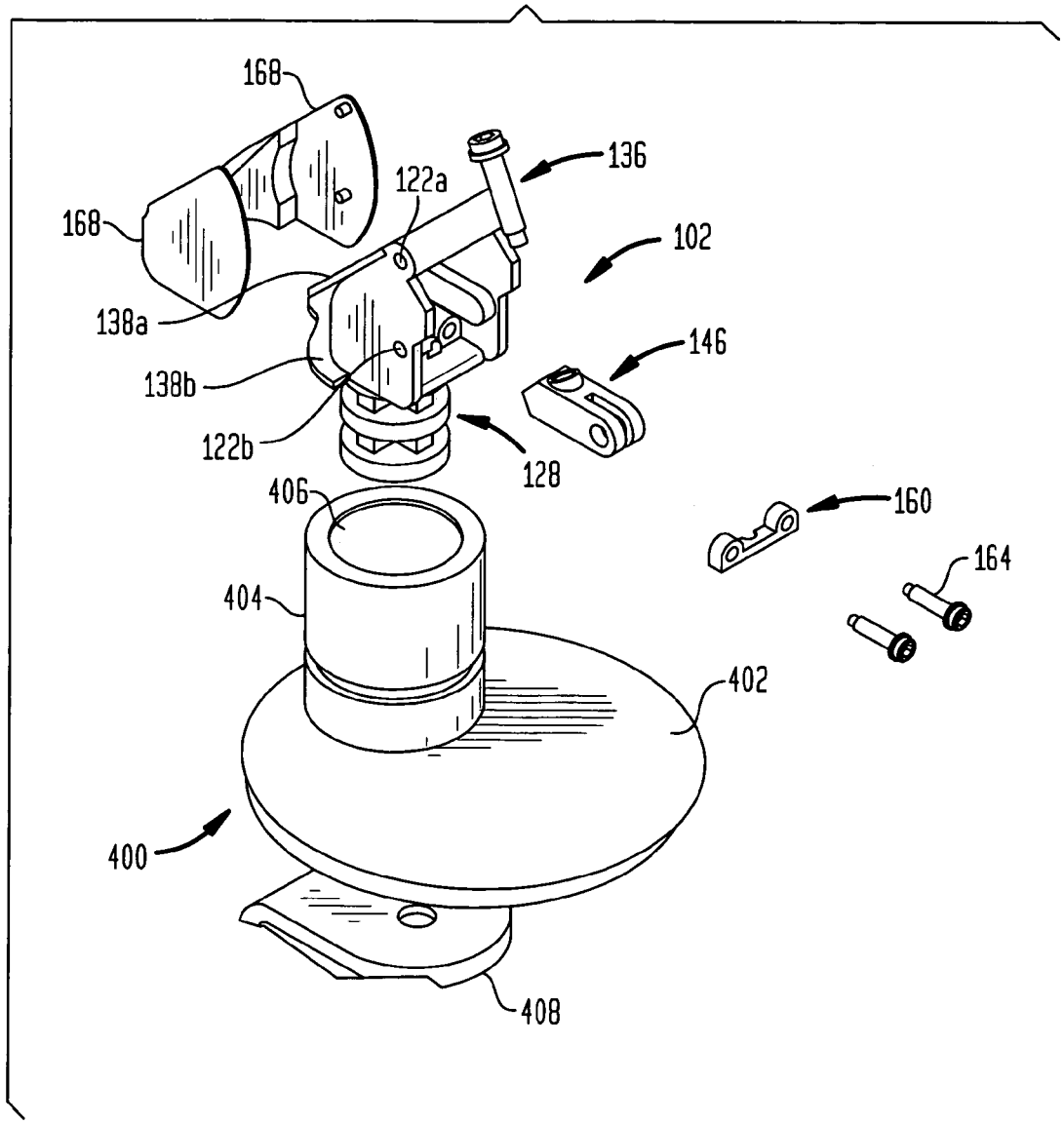
FIGS. 14A-D illustrates an exploded view of a clevis assembly in accordance with a preferred embodiment of the present invention.
Figure 14B:
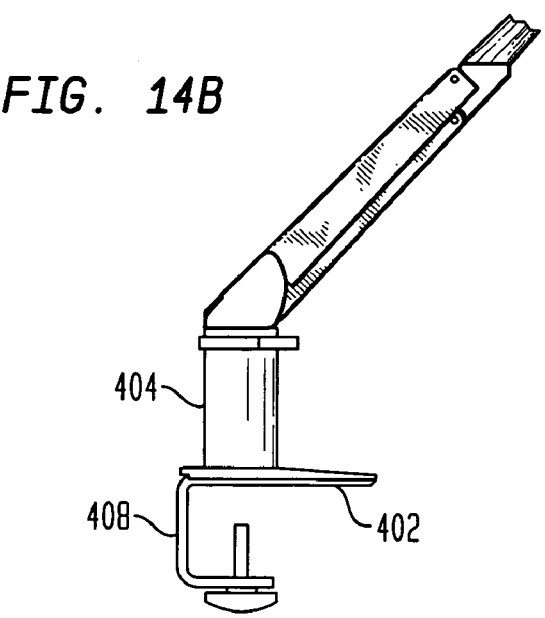
Figure 14C:
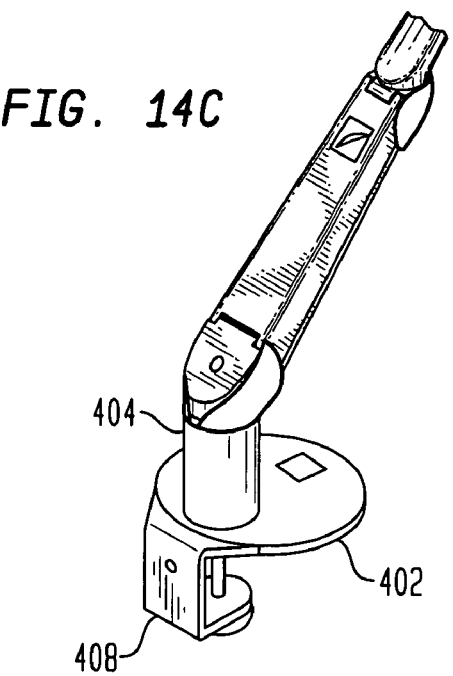
Figure 14D:
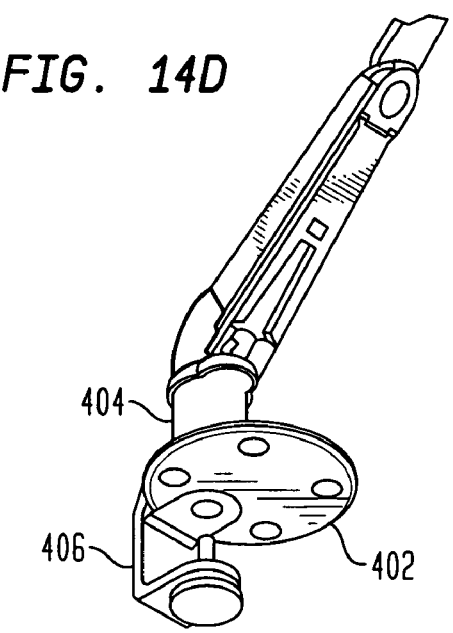
Figure 15A:
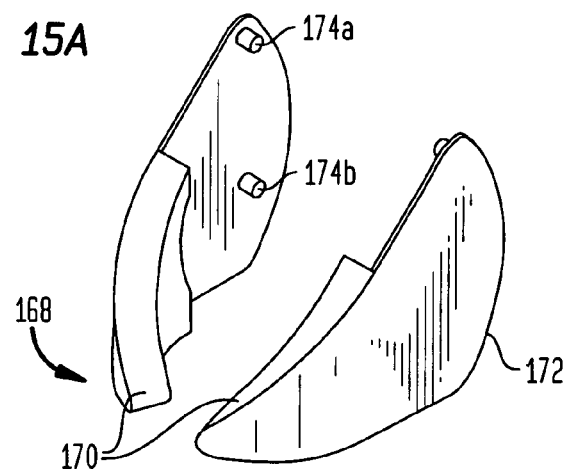
FIGS. 15A-D illustrate endcap covers in accordance with an aspect of the present invention.
Figure 15B:
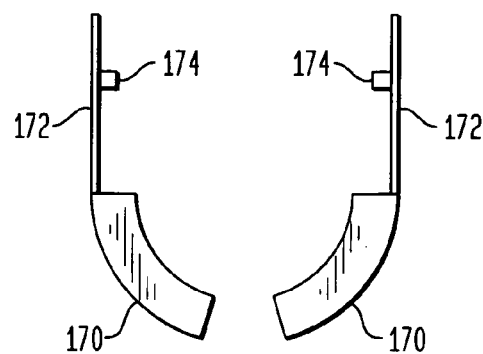
Figure 15C:
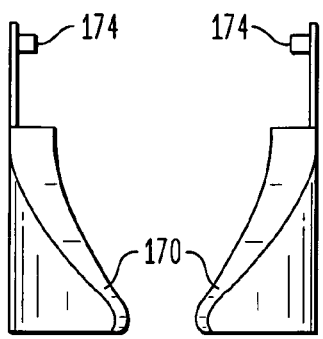
Figure 15D:
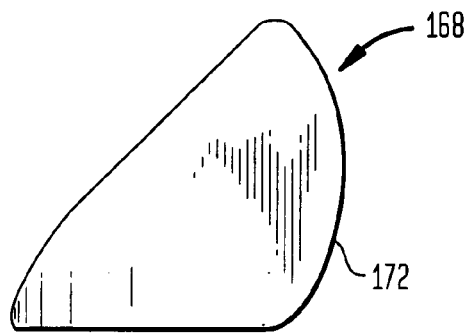

FIGS. 12F-H illustrate the hole 148 and the openings 154 in phantom. As best seen in FIG. 12G, the hole 148 is placed at an angle α, which can be taken relative to the bottom or the top of the clevis 146, e.g. In one embodiment, the angle α is at least about 20°. In another embodiment, the angle α is less than about 80°. In yet another embodiment, the angle α is between 45° and 75°. More preferably, the angle α is on the order of 60° to 70°. Most preferably, the angle α is approximately 65°.

A second end 156 of the clevis 146 is configured to slideably engage the track 127 in the first endcap 102. More specifically, an engagement surface 158 on the second end 156 of the clevis 146 is disposed on or otherwise placed in operative/mechanical contact with the angled surface 127a of the track 127. The engagement surface 158 is positioned at an angle β, which can be taken relative to the bottom or top, e.g., of the clevis 146. β is a non-zero angle relative to the axis 121. It is desirable that the angle β is the same as the angle of the angled surface 127a. More preferably, the angle β is substantially the same or identical to the angle α, such as between 20° and 80°, desirably 45° to 75°.

FIGS. 12I-L illustrate an alternative preferred clevis embodiment. These four figures present an upward angled clevis $146_1$. A threaded hole $148_1$ receives the threaded rod 136. As seen in the top view of FIG. 12J and the side view of FIG. 12K, a first end $150_1$ of the upward angled clevis $146_1$ preferably includes spaced apart fastening members $152_1$, which are angled upward. As seen in the side view of FIG. 12K and the perspective view 12I, the upward angled fastening members $152_1$ include aligned openings $154_1$ therein. The aligned openings $154_1$ are positioned at a height $H_1$ relative to the base of the clevis $146_1$. The height $H_1$ is preferably greater than the height H of the clevis 146. In this embodiment, the height $H_1$ of the openings $154_1$ are desirably above a center line $157_1$, e.g., greater than halfway between the base and the top of the clevis $146_1$. Thus, when the gas spring is connected to the clevis $146_1$, the connection point will be at the height $H_1$ instead of the height H.

Similar to the hole 148 of the clevis 146, the hole $148_1$ is desirably placed at an angle $\alpha_1$, which can be taken relative to the bottom or the top of the clevis $146_1$. In one embodiment, the angle $\alpha_1$ is at least about 20°. In another embodiment, the angle $\alpha_1$ is less than about 80°. In yet another embodiment, the angle $\alpha_1$ is between 45° and 75°. More preferably, the angle $\alpha_1$ is on the order of 60° to 70°. Most preferably, the angle $\alpha_1$ is approximately 65°. Alternatively, the angle $\alpha_1$ may be greater than 80°, and in some situations may be substantially or exactly 90°. As will be explained in more detail below, even when the angle $\alpha_1$ is close to or at 90°, the upward angled clevis $146_1$ still provides a performance improvement over a conventional clevis.

A second end $156_1$ of the clevis $146_1$ is configured to slideably engage the track 127 in the first endcap 102. More specifically, an engagement surface $158_1$ on the second end $156_1$ of the clevis $146_1$ is disposed on or otherwise placed in operative/mechanical contact with the angled surface 127a of the track 127. The engagement surface $158_1$ is positioned at an angle $\beta_1$, which can be relative to the bottom or the top of the clevis $146_1$, e.g. Of course, it should be understood that the angle $\beta_1$ may be the same as the angle of the angled surface 127a. More preferably, the angle $\beta_1$ is substantially the same or identical to the angle $\alpha_1$. For example, $\beta_1$ may be greater than 20° and less than 80°, such as between 45° and 75°, or 80° or more.

FIGS. 12M-P illustrate yet another preferred clevis embodiment. These four figures present a downward angled clevis $146_2$. A threaded hole $148_2$ receives the threaded rod 136. As seen in the top view FIG. 12N and the side view FIG. 12O, a first end $150_2$ of the downward angled clevis $146_2$ preferably includes spaced apart fastening members $152_2$, which are angled downward. As seen in the side view FIG. 12O and the perspective view 12M, the downward angled fastening members $152_2$ include aligned openings $154_2$ therein. The aligned openings $154_2$ are positioned at a height $H_2$ relative to the base of the clevis $146_2$. In this embodiment, the height $H_2$ of the aligned openings $154_2$ are desirably below a center line $157_2$ less than halfway between the base and the top of the clevis $146_2$. The height $H_2$ is preferably less than the height H of the clevis 146. Thus, when the gas spring is connected to the clevis $146_2$, the connection point will be at the height $H_2$ instead of the height H.

Similar to the hole 148 of the clevis 146, the hole $148_2$ is desirably placed at an angle $\alpha_2$ relative to the bottom of the clevis $146_2$. In one embodiment, the angle $\alpha_2$ is at least about 20°. In another embodiment, the angle $\alpha_2$ is less than about 80°. In yet another embodiment, the angle $\alpha_2$ is between 45° and 75°. More preferably, the angle $\alpha_2$ is on the order of 60° to 70°. Most preferably, the angle $\alpha_2$ is approximately 65°. Alternatively, the angle $\alpha_2$ may be greater than 80°, and in some situations may be substantially or exactly 90°. As will be explained in more detail below, even when the angle $\alpha_2$ is close to or at 90°, the downward angled clevis $146_2$ still provides a performance improvement over a conventional clevis.

A second end $156_2$ of the clevis $146_2$ is configured to slideably engage the track 127 in the first endcap 102. More specifically, an engagement surface $158_2$ on the second end $156_2$ of the clevis $146_2$ is disposed on or otherwise placed in operative/mechanical contact with the angled surface 127a of the track 127. The engagement surface $158_2$ is positioned at an angle $\beta_2$ relative to the bottom or the top of the clevis $146_2$. Of course, it should be understood that the angle $\beta_2$ may be the same as the angle of the angled surface 127a. More preferably, the angle $\beta_2$ is substantially the same or identical to the angle $\alpha_2$. For example, $\beta_2$ may be between 20° and 80°, such as between 45° and 75°, or, alternatively, 80° or more.

Figure 13A:
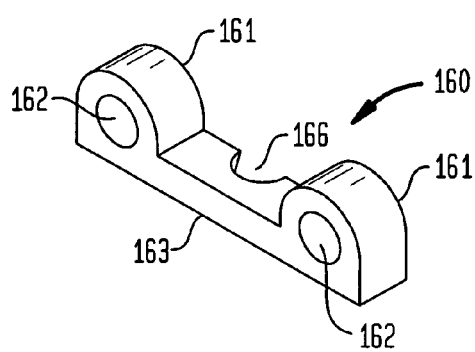
FIGS. 13A-E illustrate a retaining plate in accordance with an aspect of the present invention.
Figure 13D:
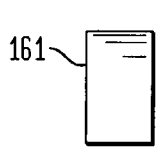
Figure 13B:
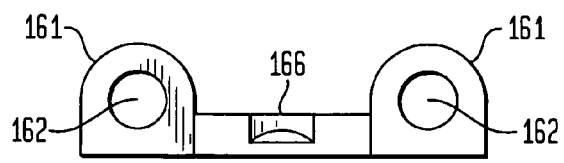
Figure 13C:
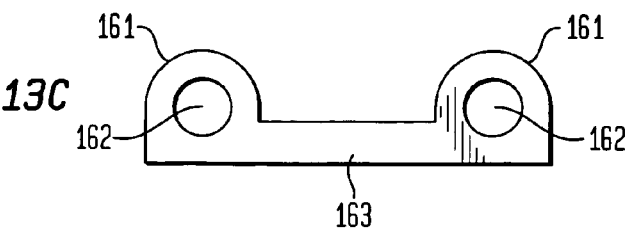
Figure 13E:
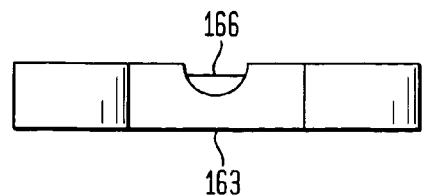

FIGS. 13A-E illustrate another element of the clevis assembly, specifically a retaining plate 160. As seen in the perspective view of FIG. 13A and the respective front and bottom views of FIGS. 13B-C, the retaining plate 160 preferably includes a pair of spaced apart knobs 161 having through holes 162 adapted to receive fasteners 164 (see FIG. 9). The spaced apart knobs 161 are positioned at either end of a body 163. FIG. 13D illustrates a side view of the retaining plate 160. As seen in the front view of FIG. 13B and the top view of FIG. 13F, it can be seen that the retaining plate 160 preferably also includes a recess 166 along a first side of the body 163.

FIG. 14 illustrates an exploded view of the clevis assembly, the first endcap 102, and the mounting assembly 400. The mounting assembly 400 may include a base 402 and a mounting cup 404 disposed thereon. The mounting cup 404 preferably includes an opening or receptacle 406 adapted to receive the shaft 128 of the first endcap 102. A connecting member 408 such as a bracket can be used to connect the mounting assembly 400 to a piece of furniture, a wall, or other stable support. Also shown in the figure is a pair of first endcap covers 168. An alternative connecting member 408 is shown in FIGS. 14B-D.

The pair of first endcap covers 168 are shown in more detail in FIGS. 15A-D. As shown in the perspective view of FIG. 15A, the first endcap covers 168 are each preferably formed as a single integral piece, which may be molded plastic or metal. The specific shapes of the endcap covers 168 can be adapted based upon the configuration of the first endcap 102. As seen in the top view of FIG. 15B and the back view of FIG. 15C, the first endcap covers 168 are generally triangular in shape. The first endcap covers 168 desirably each include a rib or base portion 170 which may be contoured or angled, and a cover 172. The cover 172 is preferably integrally formed with the base portion 170. A pair of pins, protrusions or other fastening members 174 may be disposed on an inside face of the cover 172.

After the clevis assembly, the first endcap 102, and the upper and lower channels 104, 106 are connected together, as will be explained shortly, the first endcap covers 168 can be placed over the assembled components. The first endcap covers 168 are adapted to mask or hide some or all of the outer surfaces of the sidewall 120 of the first endcap 102, and can be used to modify or enhance the appearance of the first endcap 102. See FIG. 8. The base portion 170 of each first endcap cover 168 preferably fits between the upper and lower flanges 138a,b on one side of the first endcap 102. A first pair 174a of the fastening members 174 can connect to holes or openings in the upper channel 104. A second pair 174b of the fastening members 174 can connect to holes or openings in the lower channel 106.

Referring back to FIG. 14A, the clevis assembly and the first endcap 102 may be connected as follows. The clevis 146 is inserted into the housing 114 of the first endcap 102. The engagement surface 158 on the second end 156 of the clevis 146 is positioned in operative contact with the angled surface 127a of the track 127 within the first endcap 102.

The threaded rod 136 is positioned inside the first endcap 102. Preferably, the flange 145 of the head 144 is positioned adjacent to an interior surface of the hole 134. The threaded portion 142 of the rod 136 threadedly engages the clevis 146. The tip 140 of the threaded rod 136 fits into the recess 132 of the first endcap 102.

The retaining plate 160 is positioned so that the recess 166 faces the recess 132 and the through holes 162 align with the holes or openings 130 disposed at or near the first end 116 of the housing 114. The tip 140 is desirably retained in the opening created by the recesses 132 and 166. The retaining plate 160 is secured to the housing 114 by the fasteners 164.

Figure 16A:
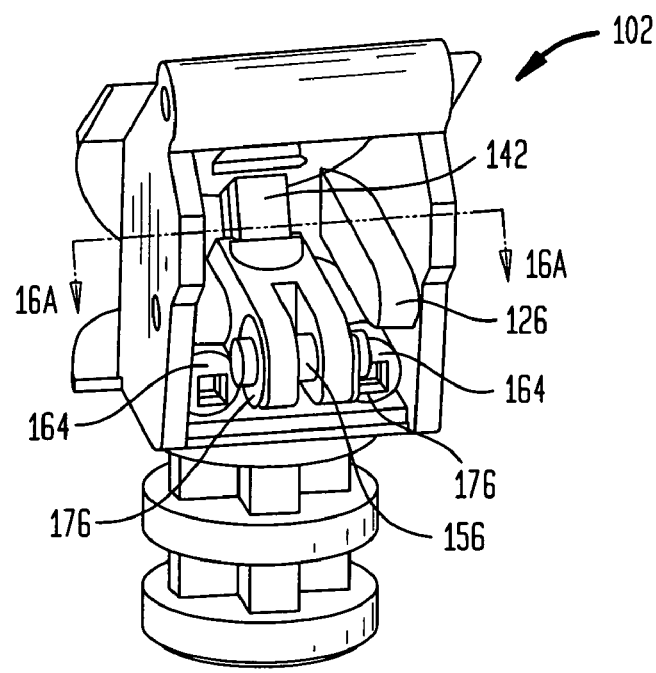
FIGS. 16A-H illustrate an endcap and clevis assembly in accordance with a preferred embodiment of the present invention.
Figure 16C:
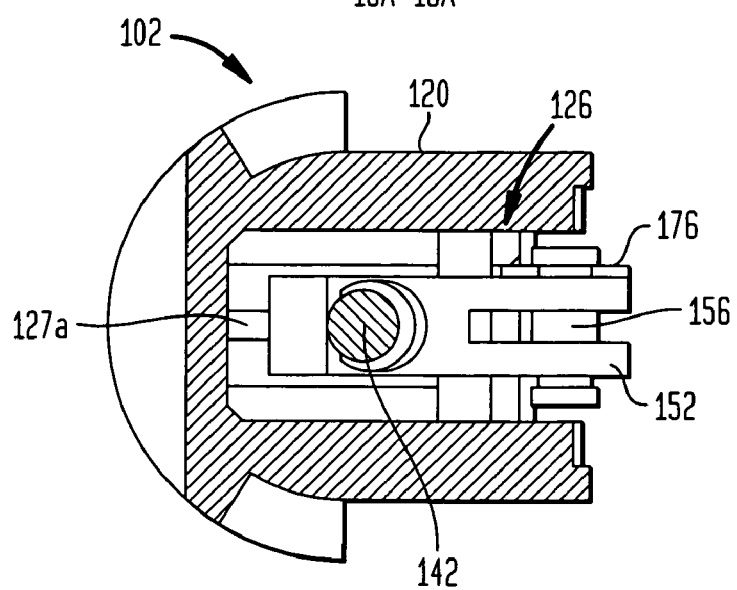
Figure 16B:
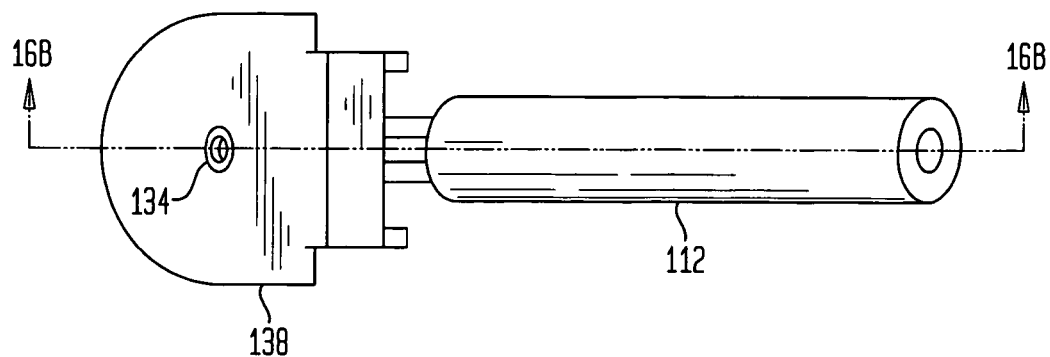

The partial assembly may be seen in FIGS. 16A-B. Here, the gas spring pin 156 is shown connected to the pair of fastening members 152a,b of the clevis 146. Optionally, one or more retaining rings 176 may secure the gas spring pin 156 to the fastening members 152a,b. FIG. 16C illustrates a cross sectional view along the A-A line of FIG. 16A. Of course, it should be understood that the gas spring pin 156 will be secured to the fastening members 152a,b in combination with the gas spring 112, as seen by the cross sectional view of FIG. 16D along the B-B line of FIG. 16B.

Figure 1:
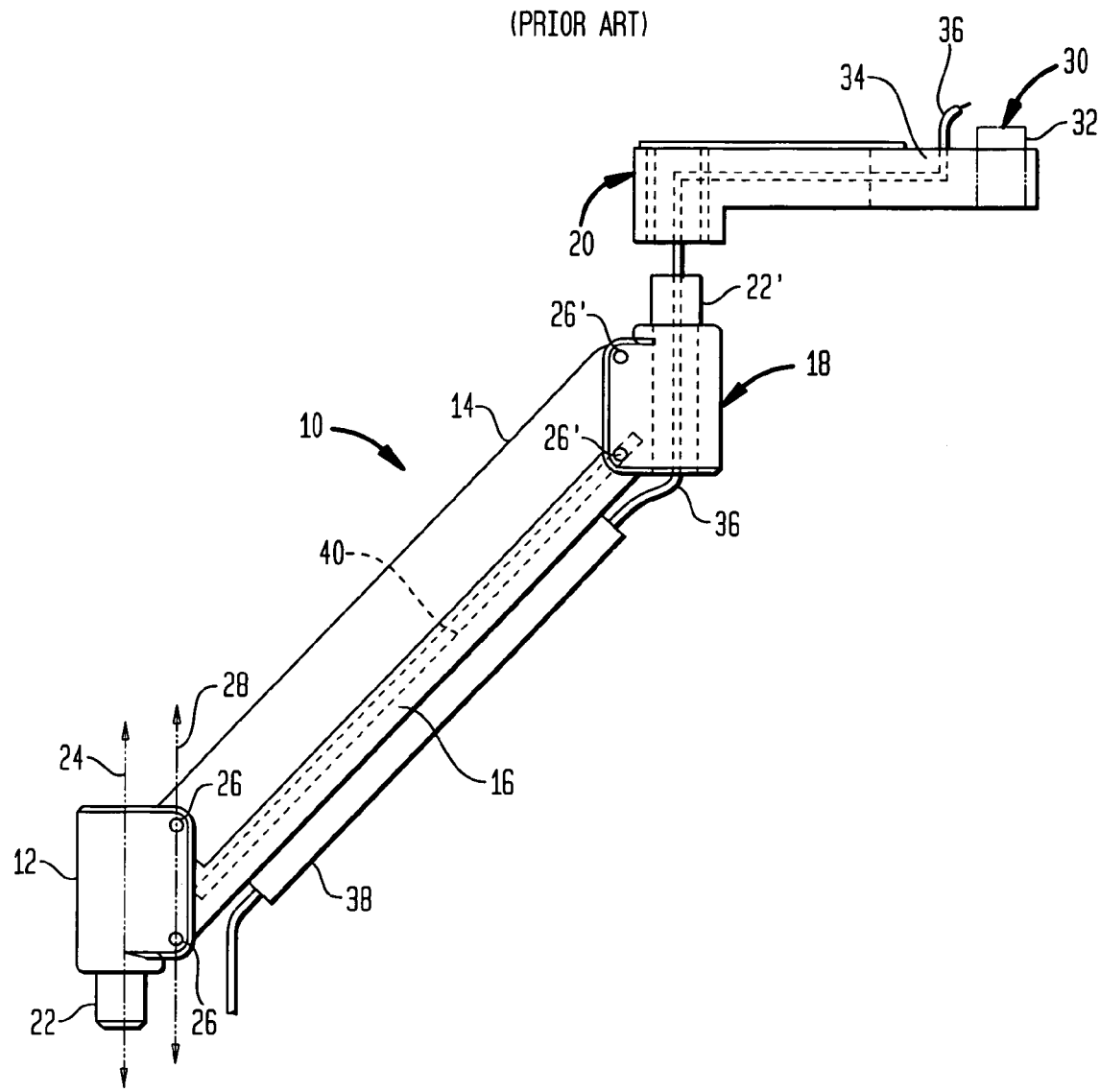
FIG. 1 is an assembly drawing of a conventional extension arm for mounting a computer monitor.
Figure 2:
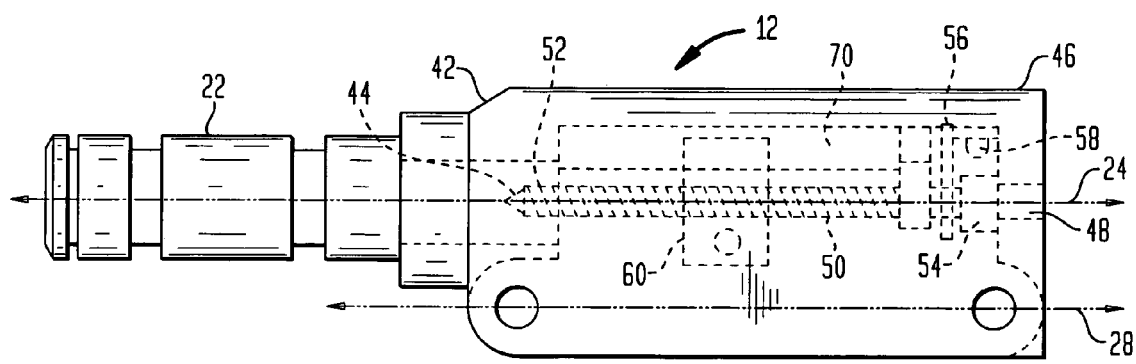
FIG. 2 illustrates a first endcap of the extension arm illustrated in FIG. 1.
Figure 3:
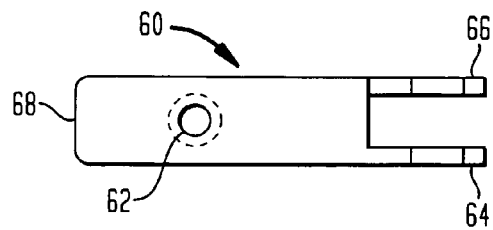
FIG. 3 illustrates the clevis assembly of the extension arm illustrated in FIG. 1.
Figure 4A:
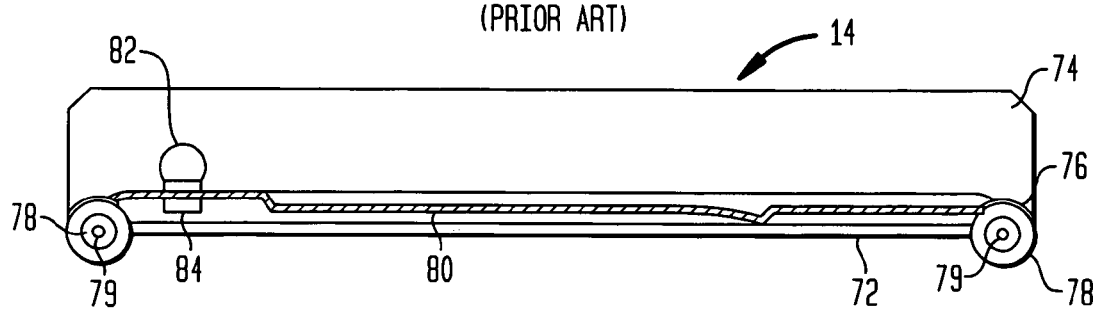
FIGS. 4A-D illustrate an upper channel of a conventional extension arm.
Figure 4B:
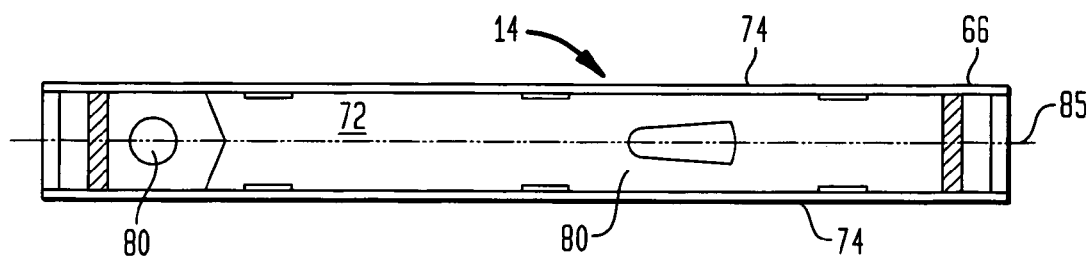
Figure 4C:
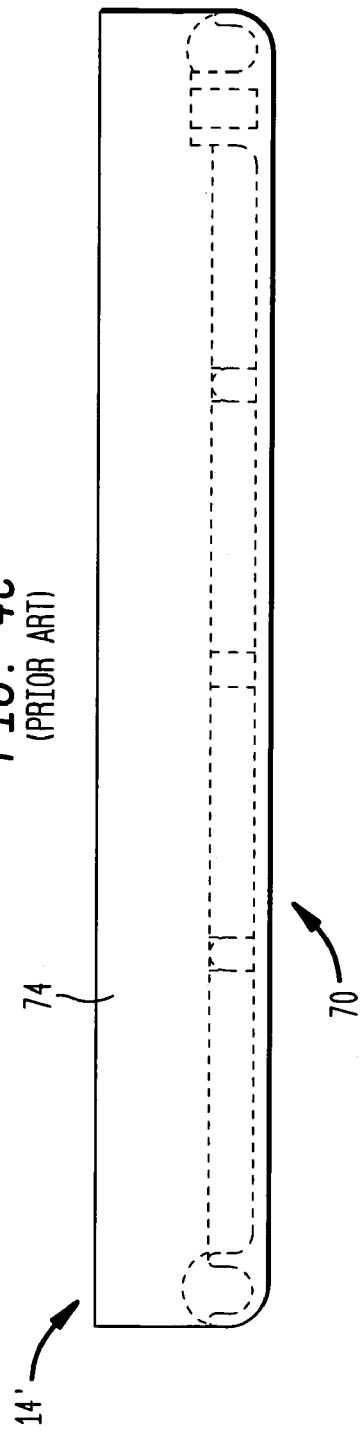
Figure 4D:
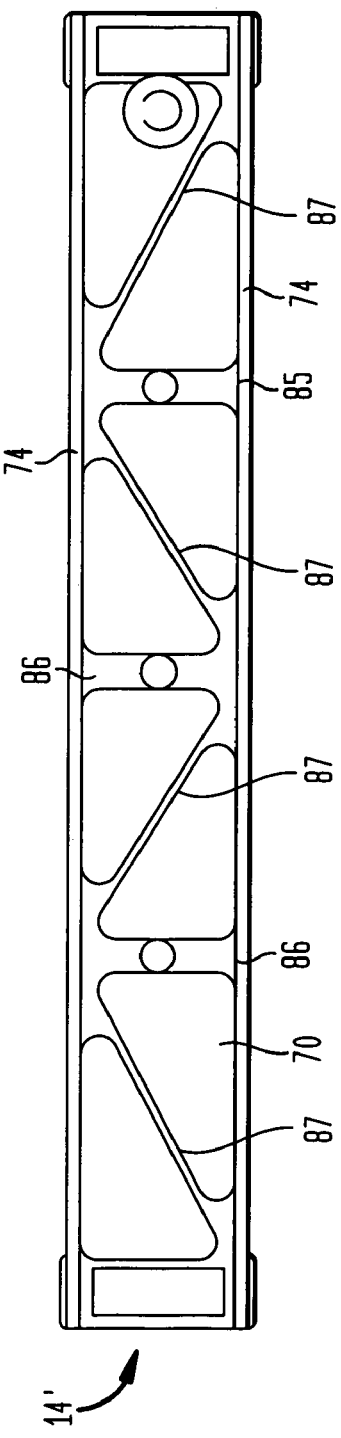
Figure 5A:
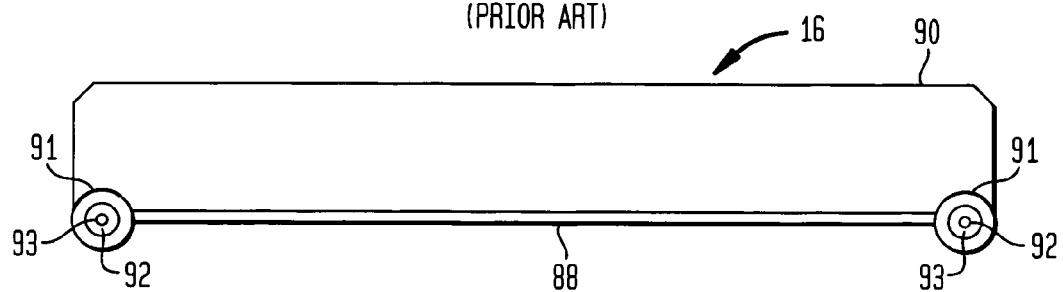
FIGS. 5A-B illustrate an lower channel of a conventional extension arm.
Figure 5B:
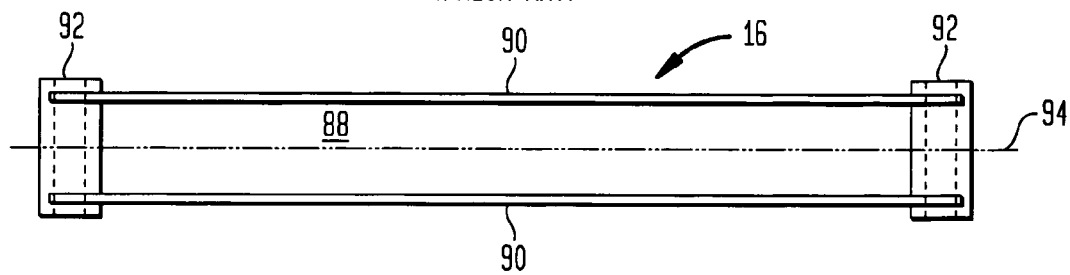
Figure 6:
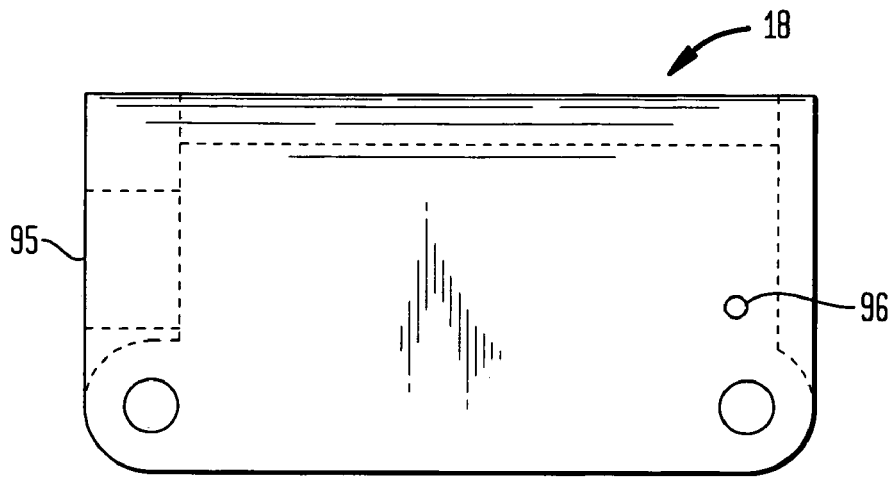
FIG. 6 illustrates a second endcap of a conventional extension arm.
Figure 7A:
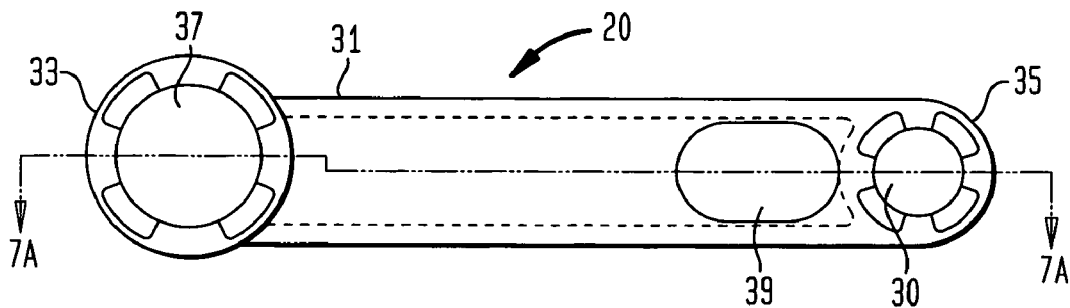
FIGS. 7A-B illustrates a forearm extension of a conventional extension arm.
Figure 7B:
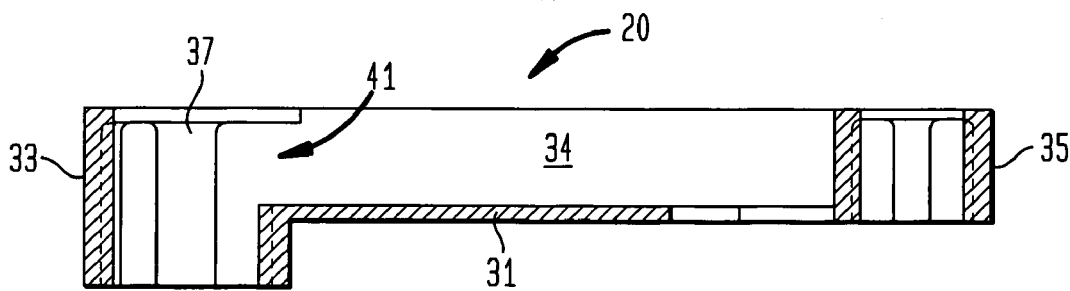

In a conventional extension arm assembly, such as in FIG. 1, oil lubricates the piston as it slides along the cylinder in the gas spring 40. If the piston is not properly lubricated, the gas spring 40 will not function properly. The oil or other fluid is typically placed within the cylinder in the gas spring 40, and the cylinder is maintained at a first end of the gas spring 40 remote from the first endcap 12. However, due to the novel arrangement in accordance with the present invention, the gas spring 112 is positioned so that the cylinder 112a is maintained at an end of the gas spring 112 at or near the first endcap 102. If the cylinder 112a were not connected to the first endcap 102 and instead were positioned oppositely and connected to the upper channel 104, the lubricating fluid could pool at the end of the cylinder 112a adjacent to the piston. This pooling would not effectively lubricate the cylinder 112a. Thus, the flipped arrangement with the cylinder 112a adjacent to the first endcap ensures proper lubrication. Furthermore, flipping the placement of the gas spring 112 enables a more compact design of the extension arm 100.

Figure 16D:
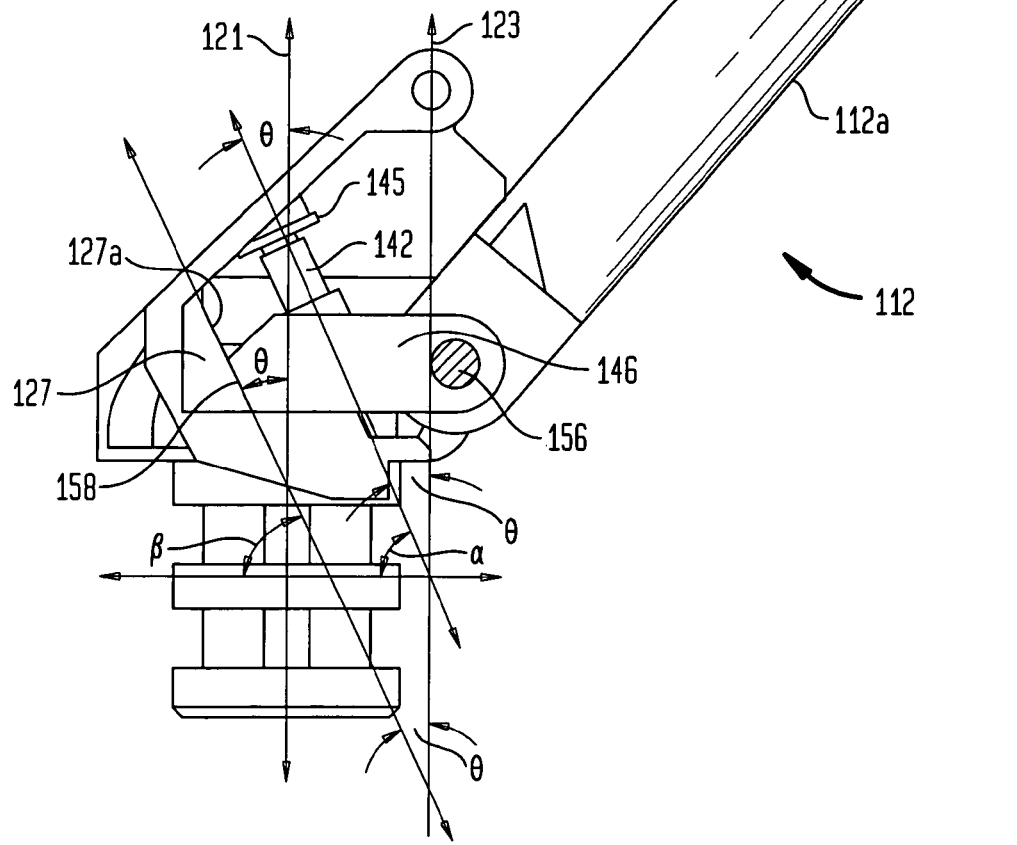

As seen in the cutaway view of FIG. 16D along the B-B line of FIG. 16B, the engagement surface 158 of the clevis 146, the angled surface 127a and the threaded rod 136 are all preferably positioned at an angle $\theta$ to the axis 121 of the first endcap 102. The angle $\theta$ is preferably at least 10° and less than 80°. The angle $\theta$ may be between 15° and 75°. More preferably, the angle $\theta$ is between 20° and 40°. Most preferably, the angle $\theta$ is on the order of 25°. As seen in FIG. 16D, the line 123b is parallel to the axis 121. Thus, the angles of the engagement surface 158, the angled surface 127a and the threaded rod 136 are preferably between 10° and 80° relative to the line 123, more preferably between 20° and 50°, such as about 25°.

The clevis assembly can be adjusted as follows. A tool such as a screwdriver or a hex-shaped key can be inserted into the hole 134 to engage the head 144 of the rod 136. The hex-shaped key is employed so as to rotate the threaded rod 136 along its axis of rotation. When the threaded rod 136 is rotated along its axis of rotation, the clevis 146 moves along the length of the threaded rod 136 in a direction that corresponds to the direction which the hex-shaped key is turned. This movement of the clevis 146 permits the gas spring 112 to be adjusted. Specifically, the clevis 146 moves up or down along the angled surface 127a of the track 127 in a path positioned at the angle θ relative to the axis 121 and, preferably, at an angle (i.e. not parallel) relative to the line 123.

It has been discovered that angling the path of the clevis 146 relative to the axis 121 and to the line 123 of the first endcap 102 provides a significant increase in the amount of load that the extension arm 100 can support, because the angling provides enhanced leverage. For example, the conventional extension arm 10 may require an 800 Newton gas spring 40 to effectively support a display. In contrast, the angled clevis configuration in the extension arm 100 can support the same load using only a 200 Newton gas spring 112.

This fourfold decrease enables a manufacturer to use a much more compact gas spring than in conventional systems, which, in turn, enables the overall extension arm 100 to be made smaller. Furthermore, the smaller gas spring 112 can be much less expensive than the bigger gas spring 40. Notwithstanding the compactness of the overall design, the cost savings alone can be a significant force in selling the extension arm 100.

Figure 16E:
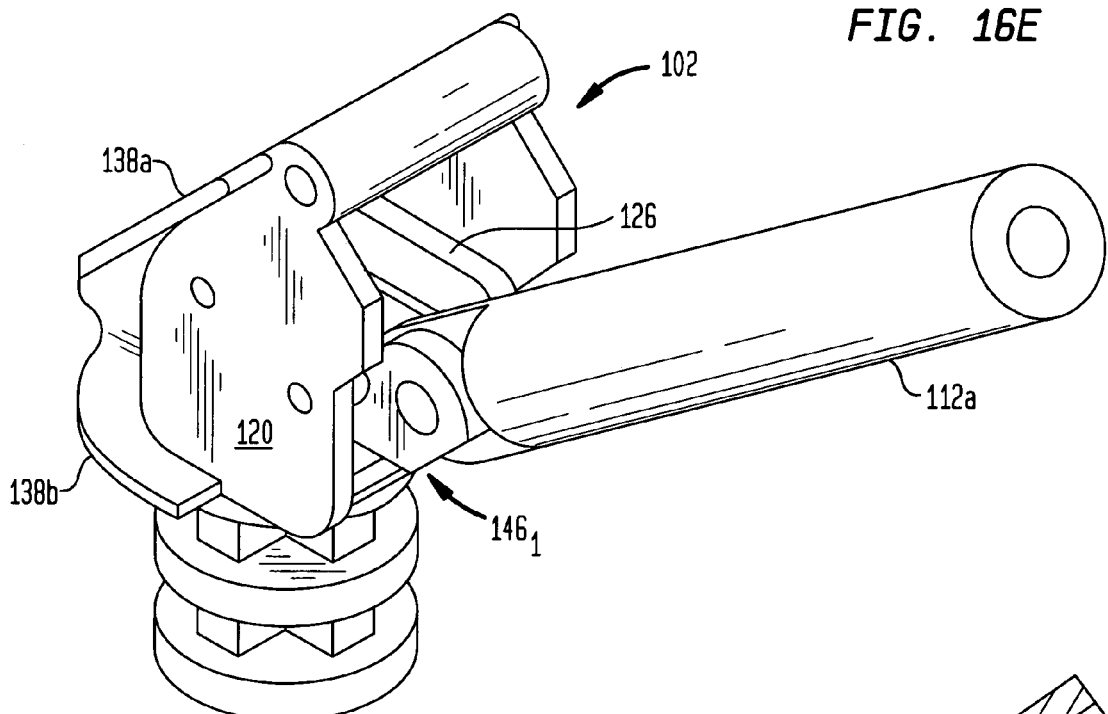
Figure 16F:
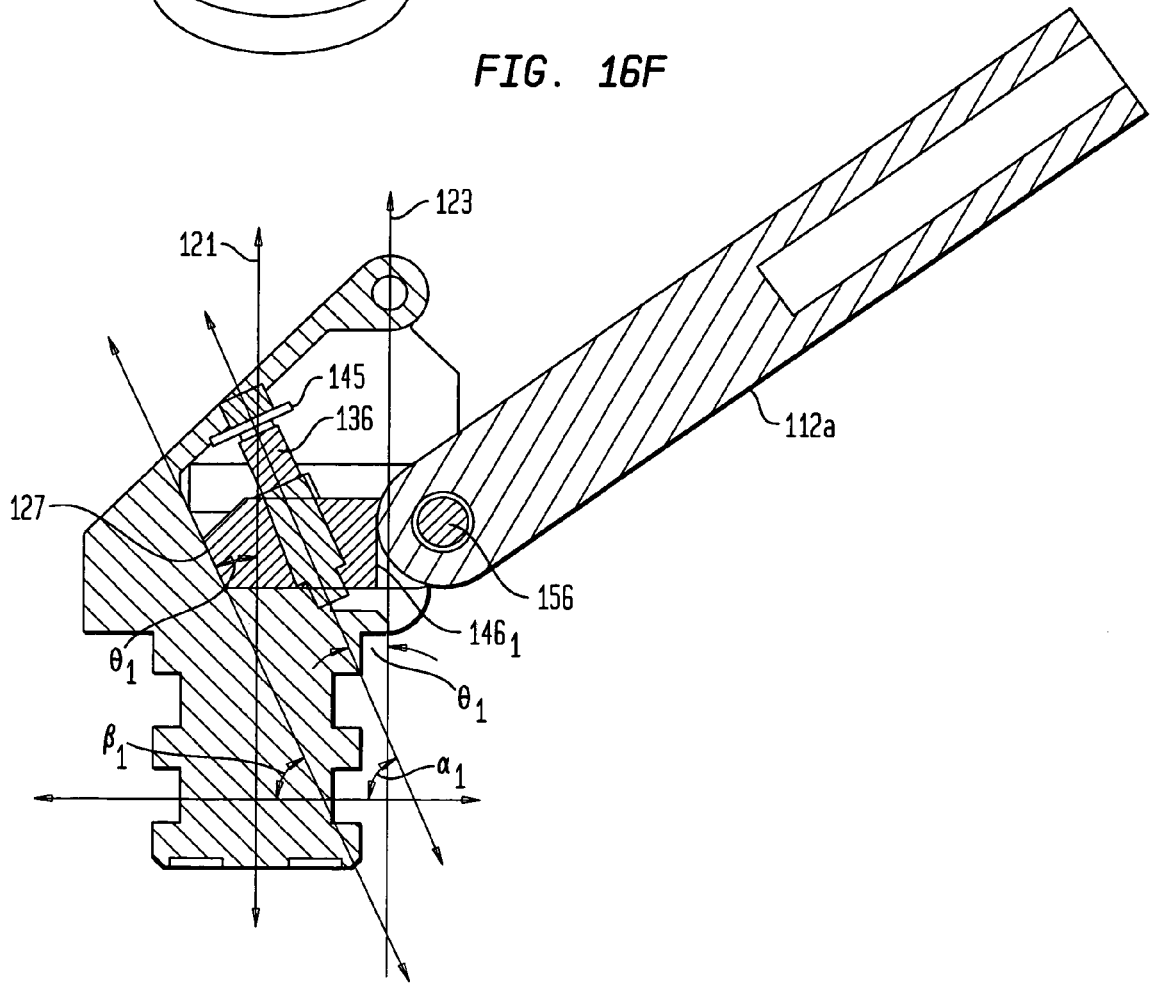
Figure 16G:
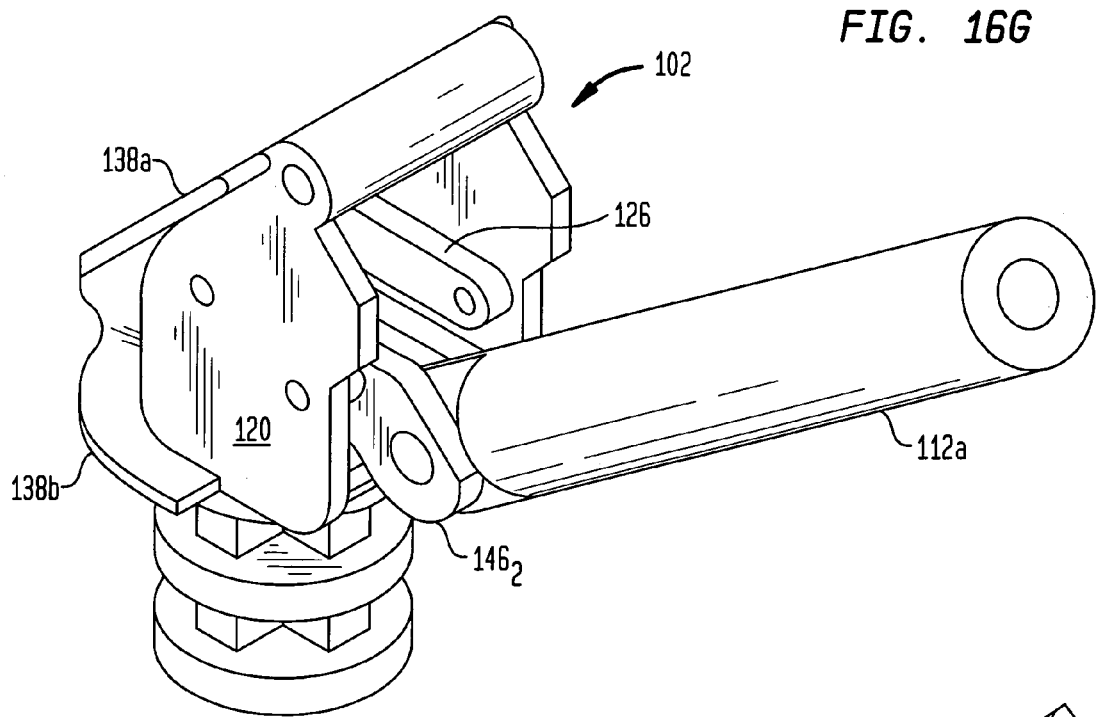
Figure 16H:
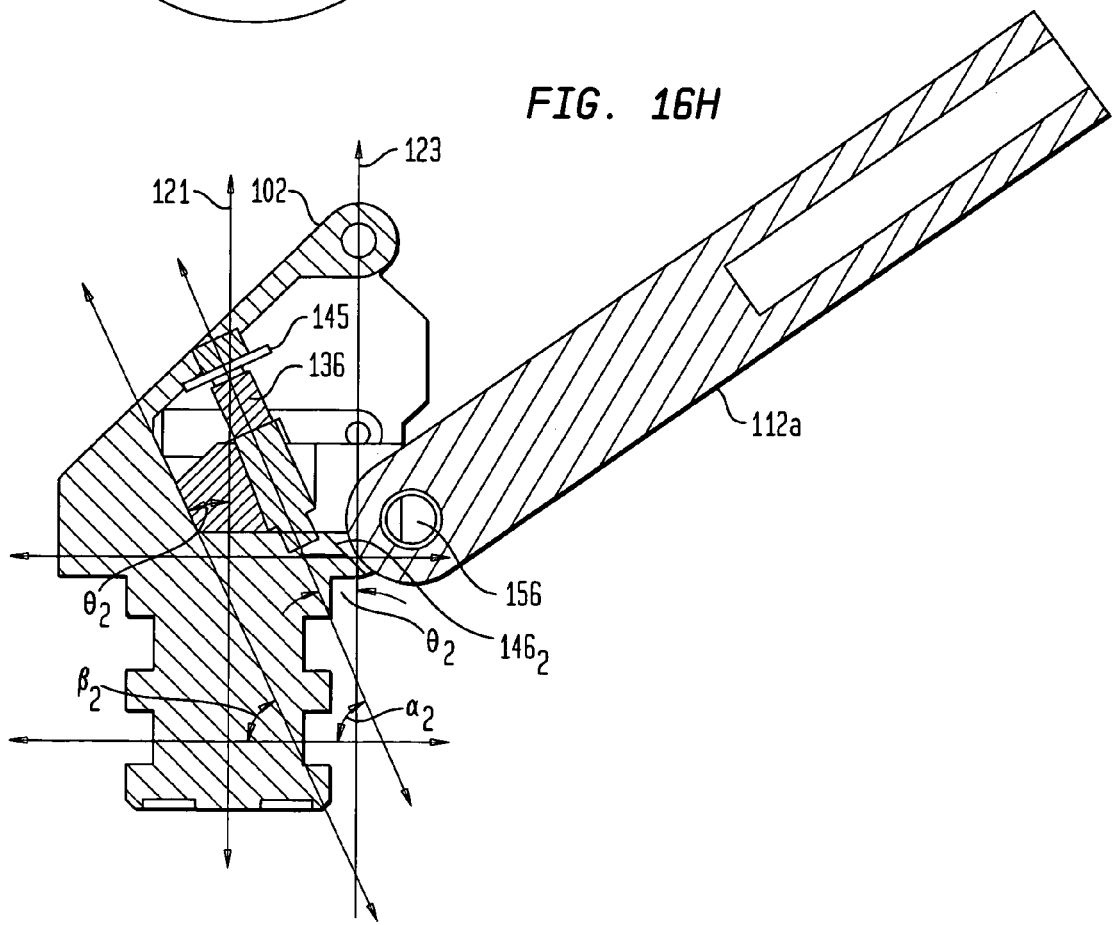

FIGS. 16E and 16F illustrate perspective and cutaway views, respectively, of the upward angled clevis $146_1$ with the clevis assembly, the first endcap 102 and the gas spring 112. FIGS. 16G and 16H illustrate perspective and cutaway views, respectively, of the downward angled clevis $146_2$ with the clevis assembly, the first endcap 102 and the gas spring 112. The angles $\theta_1$ and $\theta_2$ for clevises $146_1$ and $146_2$, respectively, may be the same as the angel θ for the clevis 146. Alternatively, the angles $\theta_1$ and $\theta_2$ may be 10° or less. As will be explained below, even at or near an angle $\theta_1$ or $\theta_2$ of 0°, the clevises $146_1$ and $146_2$ will be improvements over a conventional clevis 60.

Figure 28A:
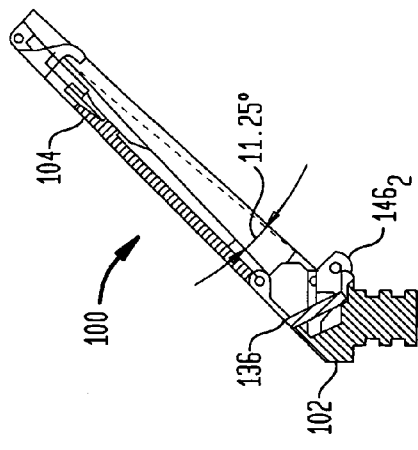
FIGS. 28A-F illustrate adjustment of an extension arm in accordance with additional aspects of the present invention.
Figure 28C:
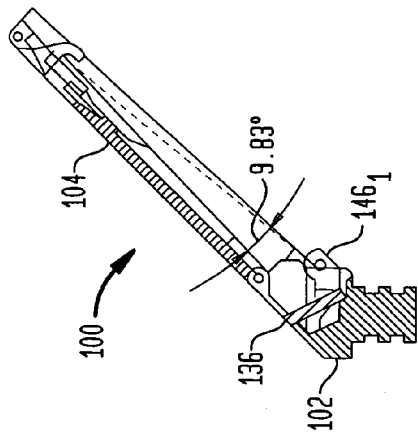
Figure 28E:
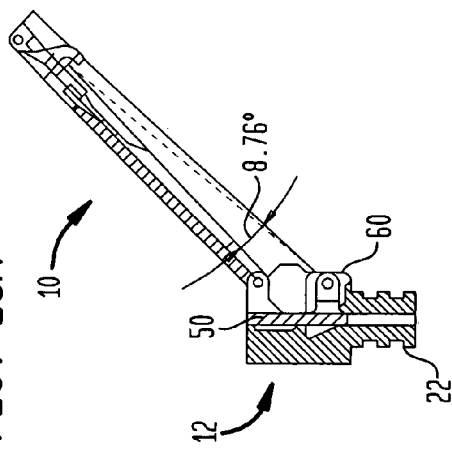
Figure 28B:
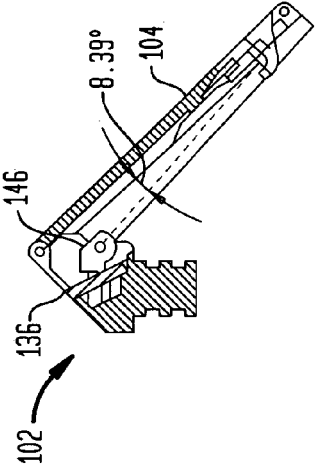
Figure 28D:
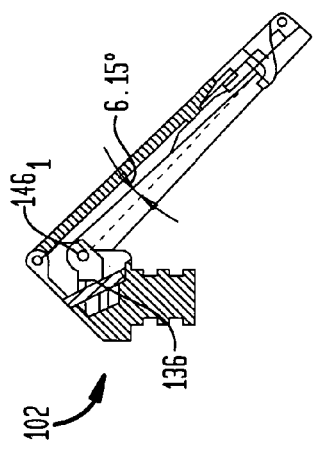
Figure 28F:
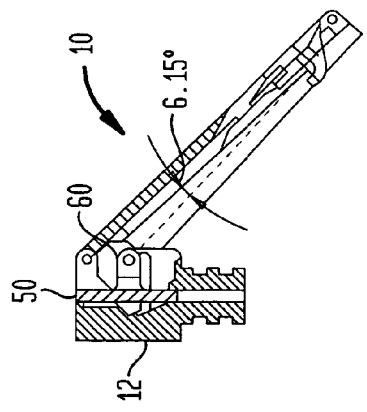

FIGS. 28A-F illustrate how the upward and downward angled clevises $146_1$ and $146_2$ function relative to a conventional straight clevis that adjusts in a manner parallel to the axis 121. Specifically, FIG. 28A shows the conventional straight clevis 60 positioned at the bottom of the track with the arm in an upward extended position. FIG. 28B shows the straight clevis 60 positioned at the top of the track with the arm in a downward extended position. FIG. 28C shows the upward angled clevis $146_1$ positioned at the bottom of the track with the arm in an upward extended position. FIG. 28D shows the upward angled clevis $146_1$ positioned at the top of the track with the arm in a downward extended position. FIG. 28E shows the downward angled clevis $146_2$ positioned at the bottom of the track with the arm in an upward extended position. FIG. 28F shows the downward angled clevis $146_2$ positioned at the top of the track with the arm in a downward extended position.

As indicated above, there are clear advantages of employing the clevises of the present invention instead of the conventional clevis 60. For example, for a given gas spring size such as 50 newtons, 200 newtons, 400 newtons or 600 newtons, the clevis 146 can handle a user device 302 of a greater weight than the clevis 60 can handle. The clevis $146_1$ can support even greater weights than the clevis 146 for a given gas spring size; and the clevis $146_2$ can support at least the weight supported by the clevis $146_1$. Tests have shown that the downward clevis $146_2$ supports the most weight for a given gas spring size. Tests have also shown that the downward clevis $146_2$ permits a greater range of motion for the extension arm than the clevis 146 or the clevis 60. These tests also show that the upward clevis $146_1$ provides the greatest range of motion for the extension arm than the clevis 146 or the clevis 60.

The upper channel 104 is illustrated in more detail in FIGS. 17A-F. The upper channel 104 preferably has a generally U-shaped body including a pair of sidewalls 178 and a cover 180. The cover 180 extends between the pair of sidewalls 178 along the length of the upper channel 104. In order to avoid parting lines that are present in conventional cast upper channels, the sidewalls 178 in a preferred embodiment do not include external cast or welded-on rollers. Instead, the sidewalls 178 are substantially flat or smooth, and have holes 182 at first and second ends 184a,b, respectively. See FIG. 17B. The first and second ends 184a,b may have thicker end portions 185, which act as internal rollers. The exposed edges of the end portions 185 about the holes 182 are preferably rounded to avoid sharp corners and to avoid impingement of the first and second endcaps 102, 108.

As seen in the top view 17A and the bottom view 17C, the upper channel 104 desirably narrows or tapers from a width $W_1$ at the first end 184a to a second width $W_2$ at the second end 184b. The views 17D and 17E are taken facing the first and second ends 184a,b, respectively. The tapering is preferably uniform and continuous along the length of the upper channel 104. The greater width $W_1$ at the first end 184a provides additional torsional strength at the base of the upper channel 104.

A reinforcement structure 186 is desirably located in the interior of the upper channel 104, as an exterior structure would be visible to end-users. FIG. 17C illustrates the reinforcement structure 186 on the interior surface of the cover 180. The reinforcement structure 186 is preferably integrally formed with the cover 180 by, e.g., cast molding, or otherwise attached thereto as a separate assembly. The reinforcement structure 186 preferably comprises a series of raised ribs 188 and spaces 190 arranged to form, e.g., a honeycomb, trellis, cellular or generally cross-ribbed structure. Cross-ribbed reinforcement structures are referred to herein as "crossribs." The reinforcement structure 186 could also comprise a continuous or otherwise non-ribbed structure.

If the reinforcement structure 186 is located in the interior of the upper channel 104, it necessarily takes up space inside the U-shaped body. This is undesirable as it limits the range of motion of the gas spring 112 or other extension and retraction device. Therefore, the reinforcement structure 186 preferably tapers in thickness from one end of the upper channel 104 to the other end of the upper channel 104, and/or tapers centrally along the middle of the upper channel 104.

The cross-ribbing or other reinforcement structure may be tapered, as shown and described in pending U.S. application Ser. No. 10/885,854, entitled "Arm Apparatus With Reinforcement," the entire disclosure of which is hereby expressly incorporated by reference herein.

Figure 17F:
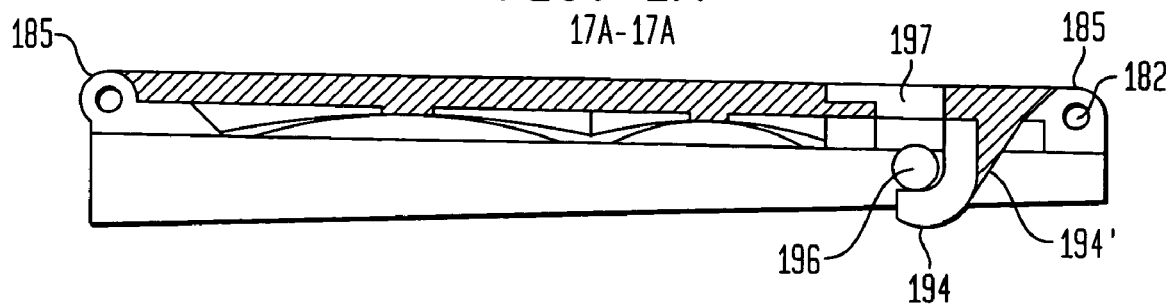

FIGS. 17A and 17C also show a support or mounting device 192 for attaching the gas spring 112 to the upper channel 104. The mounting device 192 preferably includes at least one hook or connector 194, although two connectors 194 are preferred. The cutaway view of FIG. 17F along the A-A line of FIG. 17A illustrates the connector 194 in more detail. The gas spring 112 connects to the upper channel 104 with a pin 196 or other fastener. The pin 196 is secured to the gas spring 112. As seen in FIG. 17F, the connector 194 is preferably substantially "J" or hook shaped, although other configurations are possible. The pin 196 is retained by the connector 194, thereby securing the gas spring 112 to the upper channel 104. A modification to the connector 194 is show in shaded region 194'. The additional material in the shaded region 194' can be included to provide supplemental reinforcement to the connector 194 to support very heavy devices.

It is desirable to integrally mold or die cast the mounting device 192, including the connector 194, along with the rest of the upper channel 104. In this case, a window 197 is provided in the upper channel 104 to enable the die casting. However, it is also possible separately fabricate the mounting device 192 and attach it to the upper channel 104.

A cover 198 may be inserted into the window 197 and fastened to the upper channel 104 using fasteners such as screws 200. See FIG. 9. The cover 198 is illustrated in more detail in FIGS. 18A-E. As seen in the perspective view of FIG. 18A and the top view of FIG. 18B, the cover 198 preferably includes an exterior surface 202 having a pair of through holes 204 adapted to receive the screws 200. The screws 200 are insertable through the holes 204 and desirably connect to threaded receptacles in the mounting device 192 (not shown). While two through holes 204 are shown, at least one through hole 204 should be provided. A decorative covering 205 (see FIGS. 8-9) may be affixed over the cover 198, for example to hide the screws 200 and/or to show the manufacturer's logo or an artistic design.

Figure 18C:
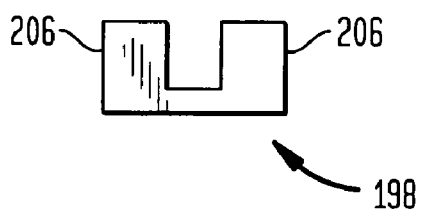
FIGS. 18A-E illustrate a cover device for use with the upper channel of FIGS. 17A-F.
Figure 18A:
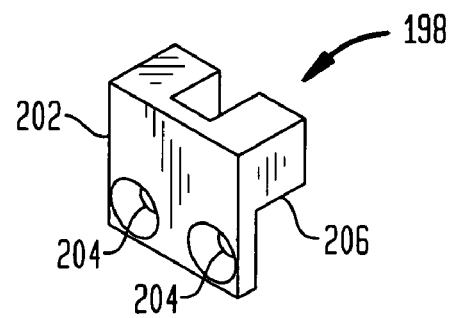
Figure 18B:
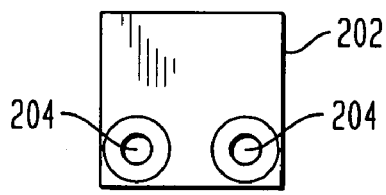
Figure 18E:
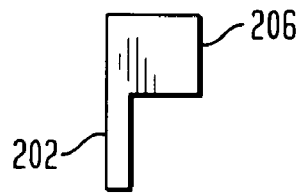
Figure 18D:
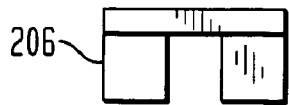
Figure 21A:
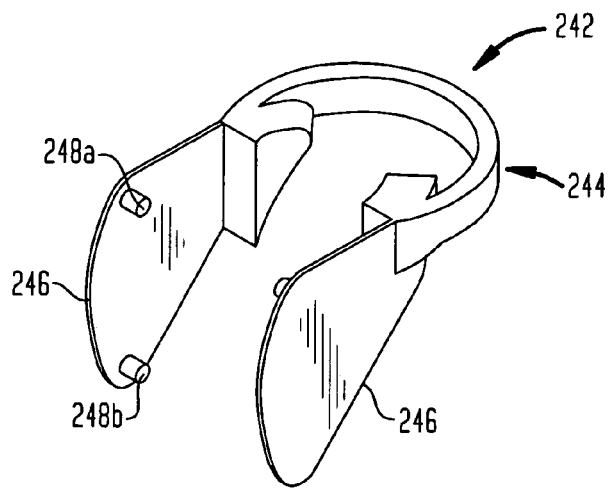
FIGS. 21A-D illustrate an endcap cover in accordance with aspects of the present invention.
Figure 21B:
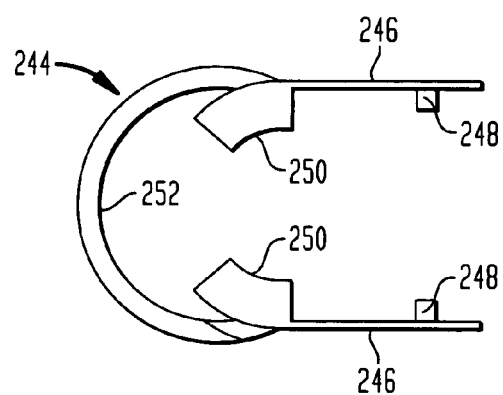
Figure 21D:
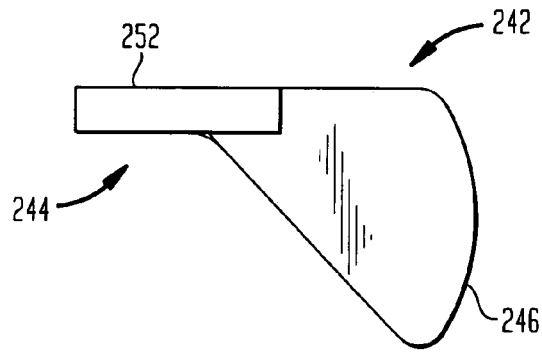
Figure 21C:
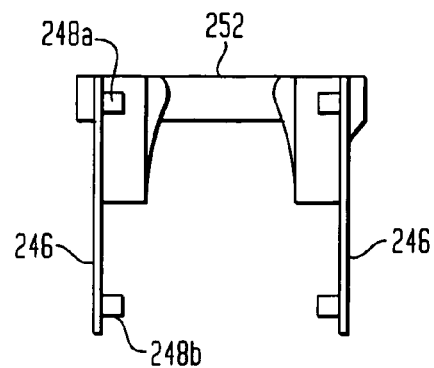

As seen in the top, bottom and side views of FIGS. 18C-18E, respectively, the cover 198 also preferably includes one or more protrusions or posts 206. When the cover 198 is affixed to the window 196, the surface 202 is preferably substantially planar with respect to the outer surface of the cover 180 of the upper channel 104. The posts 206 preferably overlie the connectors 194. The fastener or pin 196 is secured between the connectors 194 and the posts 206, thereby securing the gas spring 112 to the upper channel 104.

The lower channel 106 is illustrated in more detail in FIGS. 19A-F. The lower channel 106 preferably has a generally U-shaped body including a pair of sidewalls 208 and a cover 210. The cover 210 extends between the pair of sidewalls 208 along the length of the lower channel 106. Each of the sidewalls 208 preferably has a stepped configuration, and includes a first portion 208a adjacent to the cover 210 and a second portion 208b remote from the cover, as best seen in FIGS. 19B, 19D and 19E.

The first portions 208a of the sidewalls 208 each have a hole 212a at a first end 214a thereof. See FIG. 19B. The second portions 208b of the sidewalls 208 each have a hole 212b at a second end 214b thereof. The portions of the first end 214a adjacent to the holes 212a are preferably rounded to avoid sharp corners and to avoid impingement of the second endcap 108.

As seen in the top view 19A and the bottom view 19C, the lower channel 106 desirably narrows or tapers from a width $W_3$ at the second end 214a to a second width $W_4$ at the first end 214b. The greater width $W_3$ provides additional torsional strength at the base of the lower channel 106. The views 19D and 19E are taken facing the first and second ends 214a,b, respectively. The tapering is preferably uniform and continuous along the length of the lower channel 106. Also, while it is possible to include a reinforcement structure such as the reinforcement structure 186, this is not required in the lower channel 106, as it does not bear the kind of loads the upper channel 104 does.

As seen in FIGS. 19A and 19C, the cover 210 may include an open region 216 at or near the second end 214b. The open region can be used to provide clearance for the gas spring 112. The open region 216 may extend, for example, from the second end 214b to approximately the middle of the lower channel 106. The open region 216 may include a first region 216a near the second end 214b and a second region 216b positioned nearer the middle of the lower channel 106. In this case, the second region 216b is preferably narrower than the first region 216a. Furthermore, the cover 210 may include a tapered region 218 adjacent to the second region 216b to ensure there is enough clearance for the gas spring 112.

As best seen in FIGS. 19D and 19E, the outer faces of both of the second portions 208b are recessed relative to the outer faces of both of the first portions 208a. Thus, when the upper channel 104 and the lower channel 106 are assembled together, the inner faces of the sidewalls 178 of the upper channel 104 will be disposed next to the outer faces of the second portions 208b of the lower channel 106. As the gas spring 112 is adjusted, for example compressed or uncompressed during movement of the extension arm 100, it is possible for the upper channel 104 to slide forward or backward relative to the lower channel 106, and vice versa. Thus, the relative spacing between the inner faces of the sidewalls 178 and the outer faces of the second portions 208b can change. By way of example only, when the gas spring 112 is uncompressed, the spacing may be between 0.075 and 0.175 inches, such as 0.125 inches. However, when the gas spring 112 is fully compressed, the spacing may be anywhere from 0.075 to 0.0 inches. Edges 220 of the second end 214b may be, for example, contoured, chamfered, beveled and/or mitered, which may be done to provide clearance for the pins 124b connecting the lower channel 106 to the first endcap 102.

FIGS. 20A-F illustrate views of the second endcap 108. As seen in the perspective view of FIG. 20A, the second endcap 108 includes a housing 222. The housing 222 preferably includes a first half 224 for connecting to the upper and lower channels 104, 106, by, for example, pins, a second half 226 for connecting to the forearm extension 110, and a sidewall 228 connecting the first half 224 and the second half 226. The first half 224, the second half 226, and the sidewall 228 are preferably integrally molded or cast together. The sidewall 228 may be generally U-shaped or C-shaped in cross section, and open at one side thereof. As seen in the side view 20D, the second endcap 108 may have a substantially triangular shape or outline.

The second endcap 108 desirably includes a circular area or projection 230 on or integral with the top of the second half 226. The circular area or circular projection 230 is used in connecting the second endcap 108 to the forearm extension 110, as will be explained below. FIG. 20F is a cutaway view of the second endcap 108 along the 20A-20A line of FIG. 20B. As seen in this figure, the projection 230 preferably includes an opening 232 therein. The projection 230 preferably also includes an overhang or lip 231, which retains a bushing, as will be explained in more detail below. As seen in FIG. 20E, an opening or access way 233 is desirably provided along one face of the housing 222.

Preferably, the second endcap 108 includes pairs of upper and lower holes 234a,b, respectively, disposed on the sidewall 228. As best seen in FIG. 20D, the upper and lower holes 234a,b, are preferably vertically aligned along a line 236.

The first half 224 desirably attaches to the upper channel 104 by means of a single elongated pin 238a and to the lower channel 106 by means of a single elongated pin 238b. See FIG. 9. The elongated pins 238a,b should extend at least the width of the housing 222 and engage the upper and lower channels 104 and 106, respectively. The exterior of the housing 222 may also include a flange member 240 having an upper flange 240a and a lower flange 240b disposed on or integral with the second half 226. Similar to the upper and lower flanges 138a,b of the first endcap 102, the upper and lower flanges 240a,b are positioned at an angle $\Phi_2$ relative to one another. The angles $\Phi_1$ and $\Phi_2$ may be the same or different.

A second endcap cover 242 is presented in FIGS. 21A-D. As shown in the perspective view of FIG. 21A, the second endcap cover 242 is preferably formed as a single integral piece, which may be, for example, molded plastic or metal. As seen in the top view of FIG. 21B and the back view of FIG. 21C, the second endcap cover 242 desirably includes a central elongated rib 244 and a pair of covers 246 connected at either end of the elongated rib 244. The elongated rib 244 is preferably contoured, curved or arced. The covers 246 are preferably shaped to fit the sides of the second endcap 108. As shown in the figures, the covers 246 are substantially flat and are generally triangular in shape. A pair of pins, protrusions or other fastening members 248 may be disposed on an inside face of each cover 246.

After the second endcap 108 and the upper and lower channels 104, 106 are connected together the second endcap cover 242 can be attached. The second endcap cover 242 is adapted to cover the outer surfaces of the sidewall 228 of the second endcap 108, and can be used to modify or enhance the appearance of the second endcap 108. See FIG. 8. The elongated rib 244 of the second endcap cover 242 preferably fits between the upper and lower flanges 240a,b on either side of the second endcap 108. A first pair 248a of the fastening members 248 can connect to holes or openings in the upper channel 104. A second pair 248b of the fastening members 248 can connect to holes or openings in the lower channel 106.

Curved, arched or angled projections 250 on the elongated rib 244 also preferably fit at the juncture between the upper and lower flanges 240a,b on either side of the second endcap 108. An extended, angled or contoured part 252 of the elongated rib 244 preferably projects away from the second endcap 108. The extended part 252 can be used to provide cable management, so that a cable or cord of the device 302 is insertable between the extended part 252 and the second endcap 108.

Figure 22A:
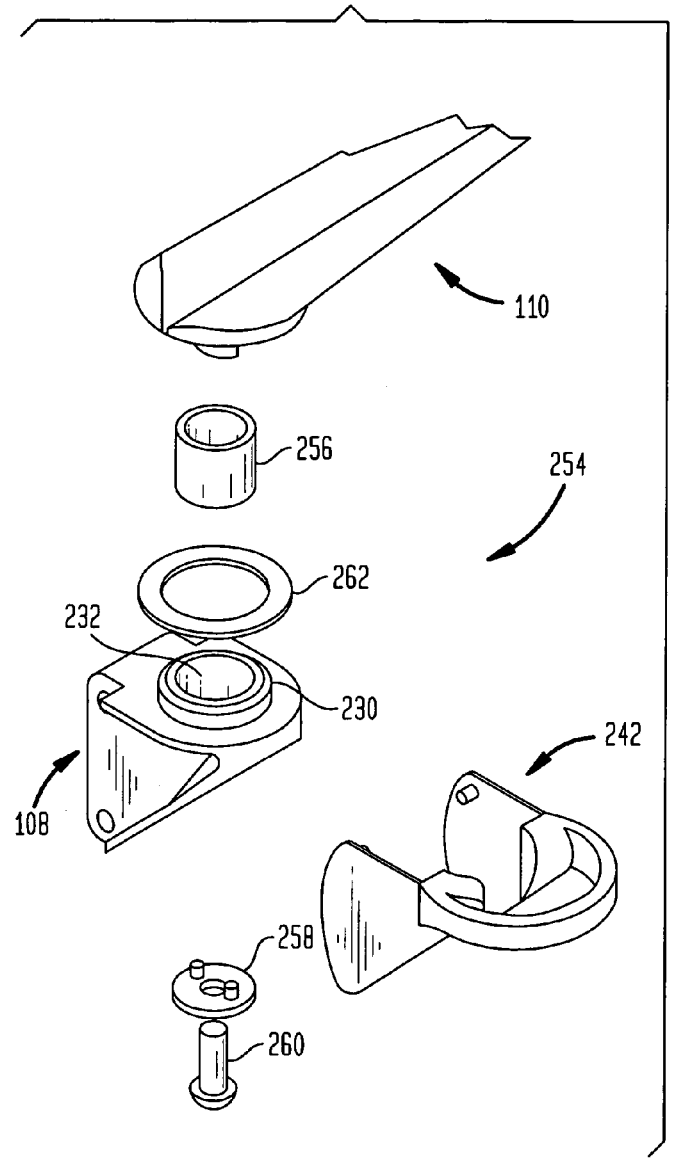
FIGS. 22A-B illustrate exploded views of a forearm assembly in accordance with a preferred embodiment of the present invention.
Figure 22B:
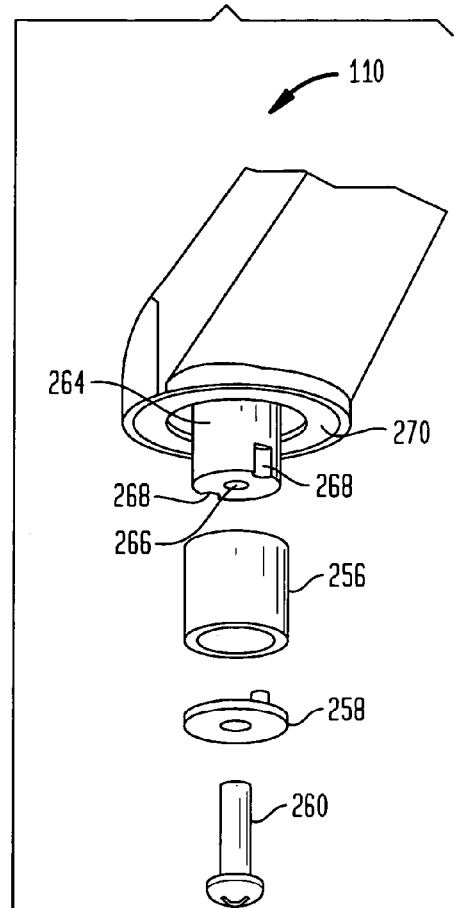
Figure 23A:
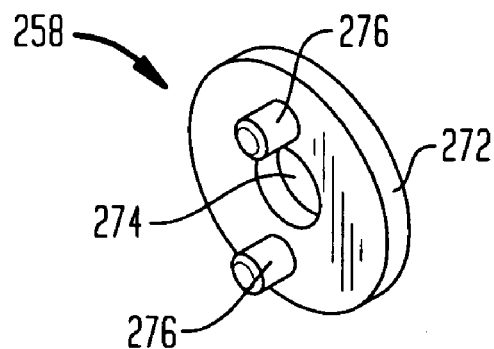
FIGS. 23A-D illustrate a preferred embodiment of a washer in accordance with aspects of the present invention.
Figure 23D:
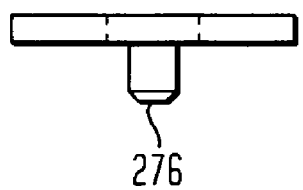
Figure 23B:
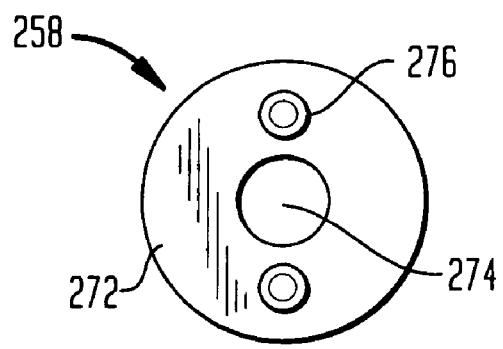
Figure 23C:
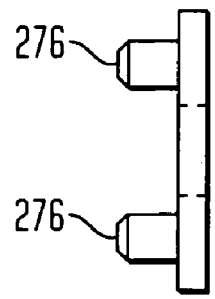

FIGS. 22A-B illustrate exploded views of forearm assembly 254 with and without the second endcap 108. As seen in the figures, the forearm assembly 254 desirably includes the forearm extension 110, bushing 256, washer 258, and a retaining mechanism such as a threaded screw or bolt 260. A second washer 262 may also be used. The washer 258 and the forearm extension 110 have been specially configured as described below to prevent loosening of the forearm extension 110 as it is moved or adjusted. This is necessary because in conventional extension arms, once the forearm extension is moved, for example rotated about the second endcap, the connection between the forearm extension and the second endcap tends to loosen, which is undesirably and potentially hazardous, especially with heavy monitors or displays.

As best seen in FIG. 22B, the bottom of the forearm extension 110 is preferably configured to include a shaft 264 or other connection device. The shaft 264 includes a central opening or receptacle 266 at the bottom thereof, as well as one or more notches or recesses 268 on either side of the shaft 264. A recess or depression 270 may also be included at the bottom of the forearm extension 110 encircling the shaft 264 to receive the second washer 262.

FIGS. 23A-D illustrate the washer 258 in more detail. As seen in the perspective view 23A and the top view 23B, the washer 258 preferably has a circular base 272 with a through hole 274 in the center. As shown in the side views of FIGS. 23C-D, a pair of protrusions or posts 276 is disposed on one side of the base 272. The posts 276 are adapted to securely fit the recesses 268 on the shaft 264.

FIGS. 24A-B illustrate cutaways views to show assembly of the second endcap 108 and the forearm assembly 254. Bushing 256, which may be a plastic material such as nylon, is inserted into the second endcap 108 through the opening or access way 233 prior to connection with the forearm extension 110. The bushing 256 is sized to fit within the opening 232. Washer 262 is placed around the circular area or projection 230 on the endcap 108. The bolt 260 is inserted into the through hole 274 of the washer 258. The washer 258 and the bolt 260 may be inserted into the access way 233 of the second endcap 108 so that the tip of the bolt projects through the opening 232 of the projection 230. The washer 258 is positioned so that the posts 276 mate with the recesses 268 on the shaft 264. Then, the bolt 260 threadedly engages the receptacle 266. As seen in FIG. 24B, the bushing 256 is retained between the washer 258 at one end and the lip 231 at the other end. When the bolt 260 is tightened, the washer 258 compresses the bushing 256 around the shaft 264 of the forearm extension 110. The posts 276 prevent the washer 258 from moving during adjustment. Thus, the forearm extension 110 is able to rotate relative to the second endcap 108, and the special configuration of the washer 258 and the shaft 264 prevents loosening of the connection.

FIG. 24B illustrates a partial cutaway view showing the forearm assembly 254 connected to the second endcap 108. Once the forearm assembly 254 is attached to the second endcap 108, the second endcap cover 242 may be connected as discussed above.

FIG. 25 illustrates an exploded view of the upper end of the forearm extension 110 and an exemplary tilting device 300 which may be used in conjunction with the present invention. The tilting device may be the same or similar to the tilting devices disclosed in pending U.S. application Ser. No. 11/058,820, filed Feb. 16, 2005, and entitled "Quick Release Assembly for an Electronic Device," or pending U.S. application Ser. No. 10/461,637, filed Jun. 13, 2003 and entitled "Tilter Apparatus for Electronic Device Having Bias Assembly," the entire disclosures of which are fully incorporated by reference herein. Alternatively, as indicated above, the tilting device 300 may also be one of the devices shown and described in U.S. Pat. No. 6,505,988.

As shown in FIG. 25, the exemplary tilting device 300 includes a tilter head 304, a tilter mount 306, an adapter unit 308, and a tilter bar 310 coupling the tilter mount 306 to the tilter head 304. The adapter unit 308 couples the electronic device 302 to the tilting device 300. A washer 312, a rivet 314 and fasteners 316 may also be a part of the tilting device 300. While the configuration of the tilting device 300 is not critical to the present invention, one may refer to the aforementioned U.S. patent application and U.S. Pat. No. 6,505,988 for specific details and examples. Nonetheless, the tilting device 300 may connect to the forearm extension 110 using a threaded screw or bolt 318.

Figure 25B:
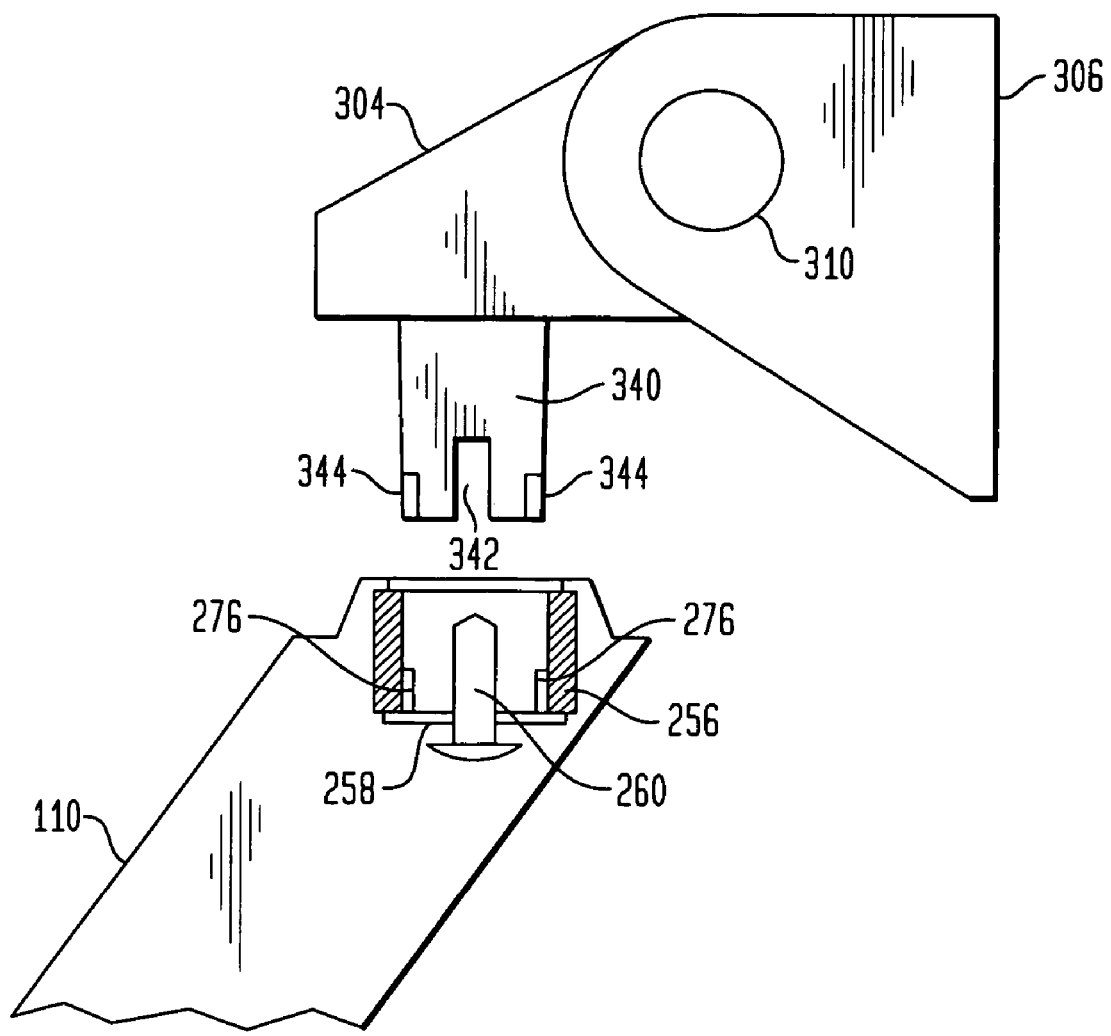

Alternatively, the special washer configuration discussed above with regard to connecting the forearm extension 110 to the second endcap 108 may be employed. Specifically, as seen in FIG. 25B, the shaft 340 of the tilter head 304 may include an opening or receptacle 342 such as the receptacle 266 at the bottom thereof, as well as a pair of notches or recesses 344 such as the recesses 268 on either side of the shaft. The bushing 256, the washer 258, and the retaining mechanism such as the threaded screw or bolt 260 may be employed, and the second washer 262 may also be used. In this case, the tilting device 300 would preferably connect to the forearm extension 110 in the same manner that the forearm extension 110 connects to the second endcap 108. However, the tilting device 300 could directly connect to the second endcap 108. Furthermore, it should be understood that the anti-loosening connection could also be employed at other positions on the extension arm 100, such as at the connection between the shaft 128 and the mounting assembly 400.

Figure 26A:
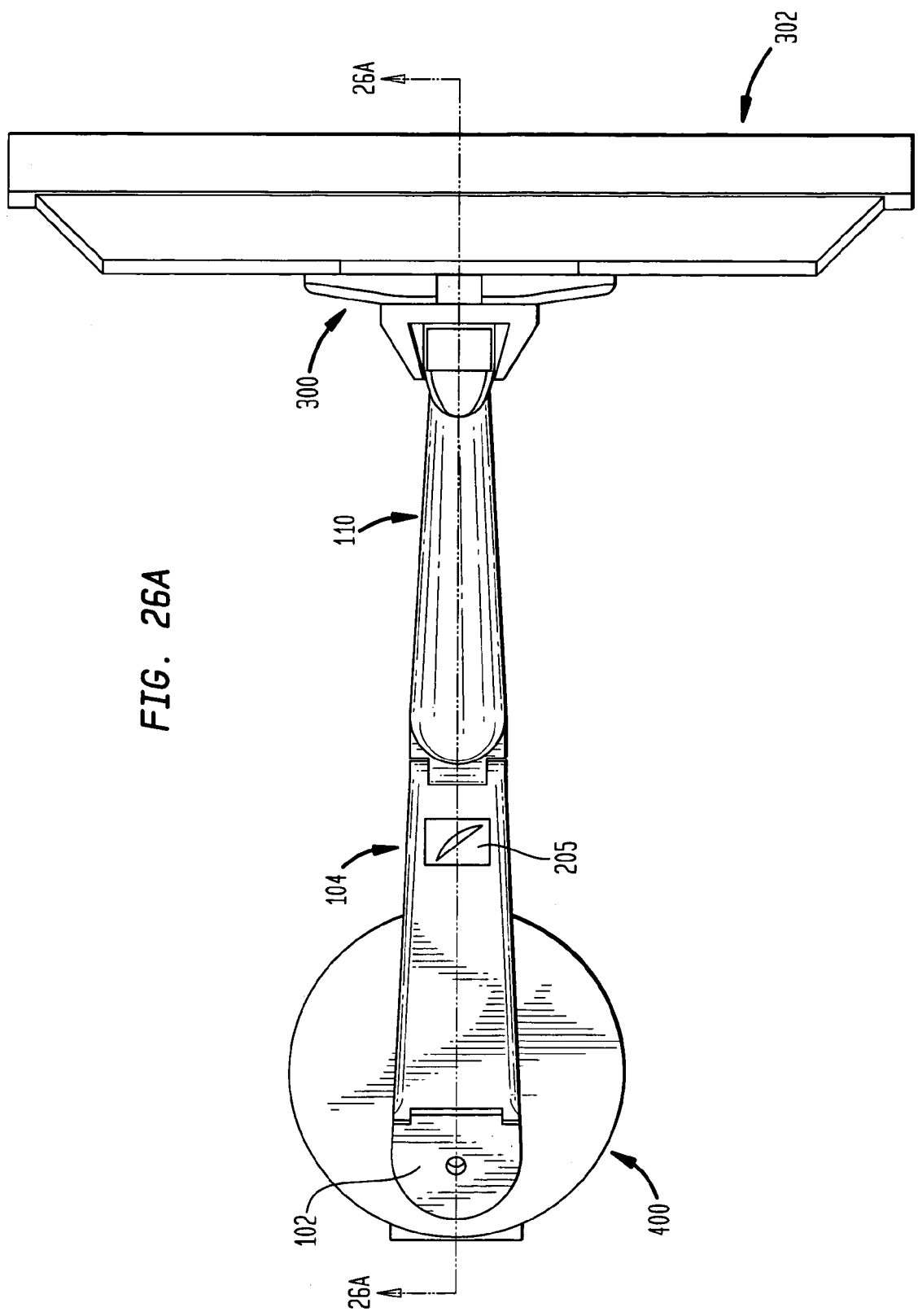

FIG. 26A illustrates a top view of the fully assembled extension arm 100, the tilting device 300, the monitor 302 and the mounting assembly 400. FIG. 26B illustrates a cutaway view of the system along the A-A line of FIG. 26A. As seen in the straight position of FIG. 26A, the tapering of the upper and lower channels 104, 106 is preferably continued by the forearm extension 110. This gives extension arm 100 the appearance of a constant projection. Furthermore, as mentioned above with respect to the upper and lower channels 104, 106, the greater width at the lower end of the forearm extension 110 provides enhanced torsional strength. The relative spacing between the inner faces of the sidewalls 178 of the upper channel 104 and the outer faces of the sidewalls 208 of the lower channel 106 helps maintain this constant projection, even as the gas piston 112 is compressed or uncompressed.

Figure 27E:
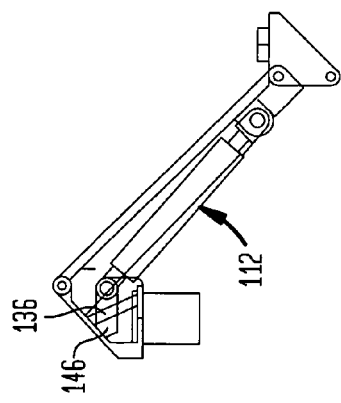
FIGS. 27A-F illustrate adjustment of an extension arm in accordance with aspects of the present invention.
Figure 27F:
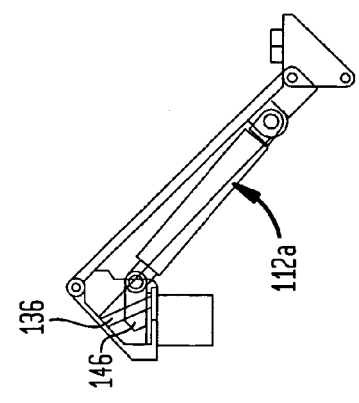
Figure 27C:
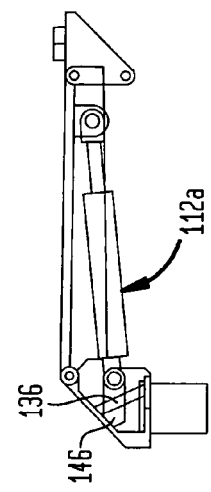
Figure 27D:
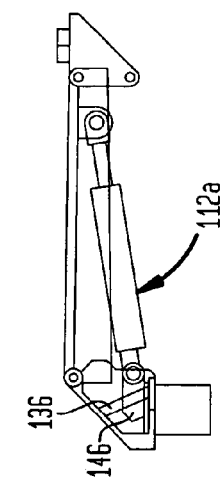
Figure 27A:
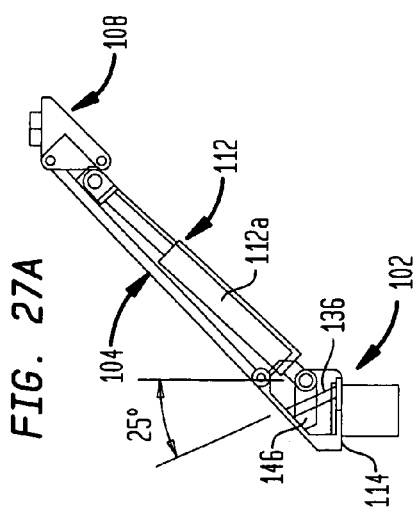
Figure 27B:
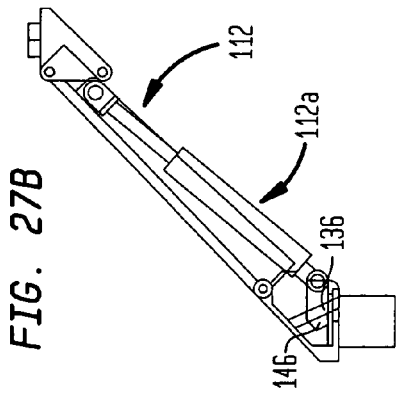

FIGS. 27A-F illustrate the extension arm 100 in various positions that the user can selectively adjust. Here, the clevis 146 is shown in various adjustment positions, although the clevis $146_1$ or the clevis $146_2$ could also be employed. As discussed above with regards to FIGS. 28A-F, the devises and assemblies of the present invention provide a greater range of motion for the extension arm than conventional devices. Also, heavier user devices 302 can also be supported for a given spring, particularly with the upward and downward devises $146_1$ and $146_2$. The forearm extension 110 is omitted from these figures, as the tilting device 300 may also connect directly to the second endcap 108 of the extension arm 100. As seen in FIGS. 27A-B, the upper and lower channels 104, 106 can be placed in a fully extended and raised position. As shown in FIG. 27A, when the clevis 146 is fully raised to the top of the housing 114, the gas spring 112 may be substantially or completely retained within the lower channel 106. However, as shown in FIG. 27B, when the clevis 146 is fully lowered to the bottom of the housing 114, the gas spring 112 may partially extend through the open region 216 of the lower channel 106.

In FIGS. 27C-D, the upper and lower channels 104, 106 can be placed in a horizontal position. As shown in FIG. 27C, when the clevis 146 is fully raised to the top of the housing 114, the gas spring 112 may partly extend through the open region 216 of the lower channel 106. However, as shown in FIG. 27D, when the clevis 146 is fully lowered to the bottom of the housing 114, the bottom end of the gas spring 112 may substantially or fully extend through the open region 216 of the lower channel 106.

In FIGS. 27E-F, the upper and lower channels 104, 106 can be placed in a fully extended and lowered position. As shown in FIG. 27E, when the clevis 146 is fully raised to the top of the housing 114, the gas spring 112 may slightly extend through the open region 216 of the lower channel 106. However, as shown in FIG. 27F, when the clevis 146 is fully lowered to the bottom of the housing 114, the bottom end of the gas spring 112 may extend further through the open region 216 of the lower channel 106.

Figure 29B:
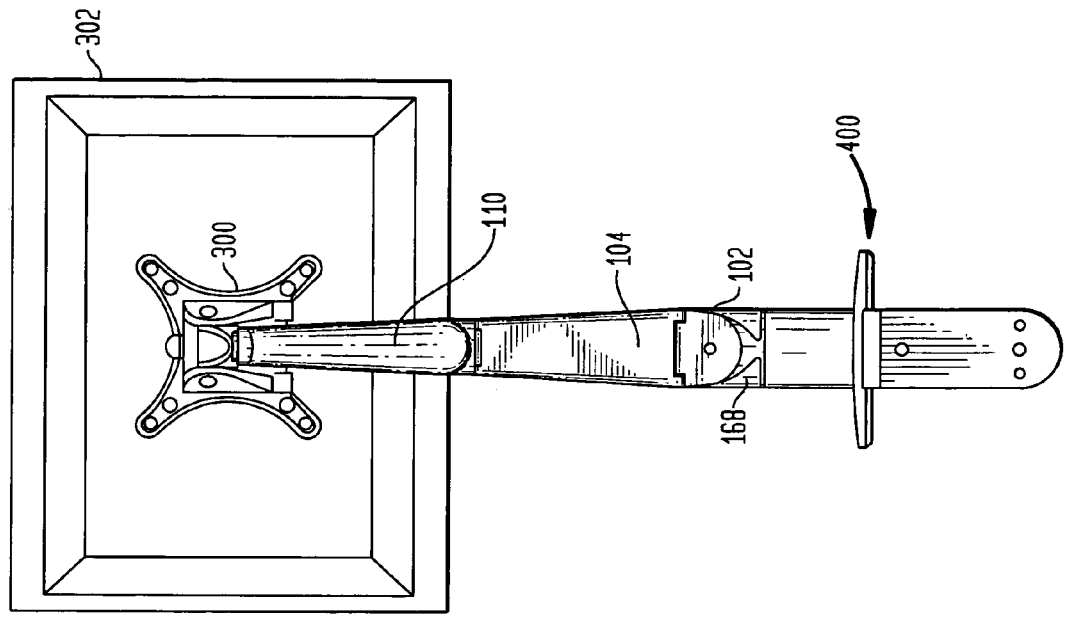
Figure 29A:
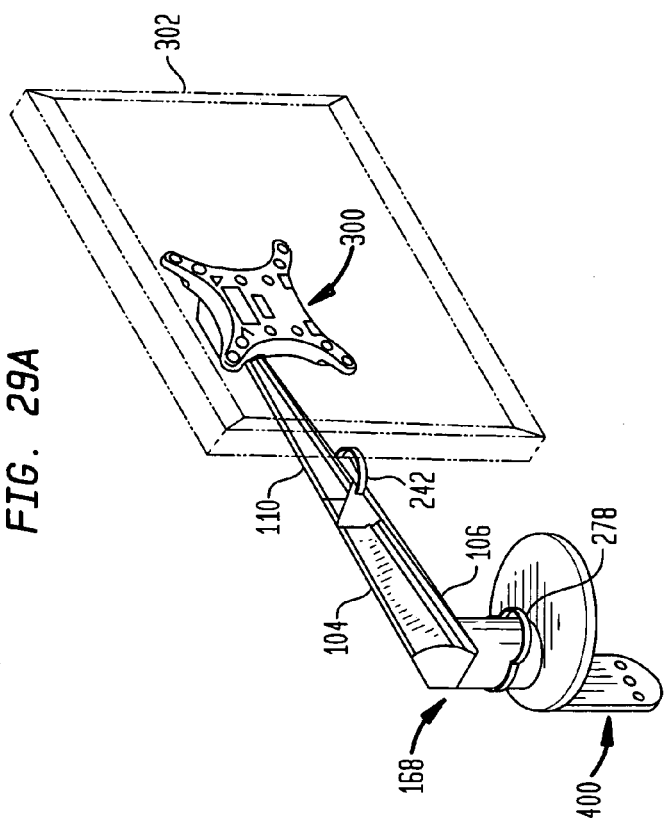
Figure 29E:
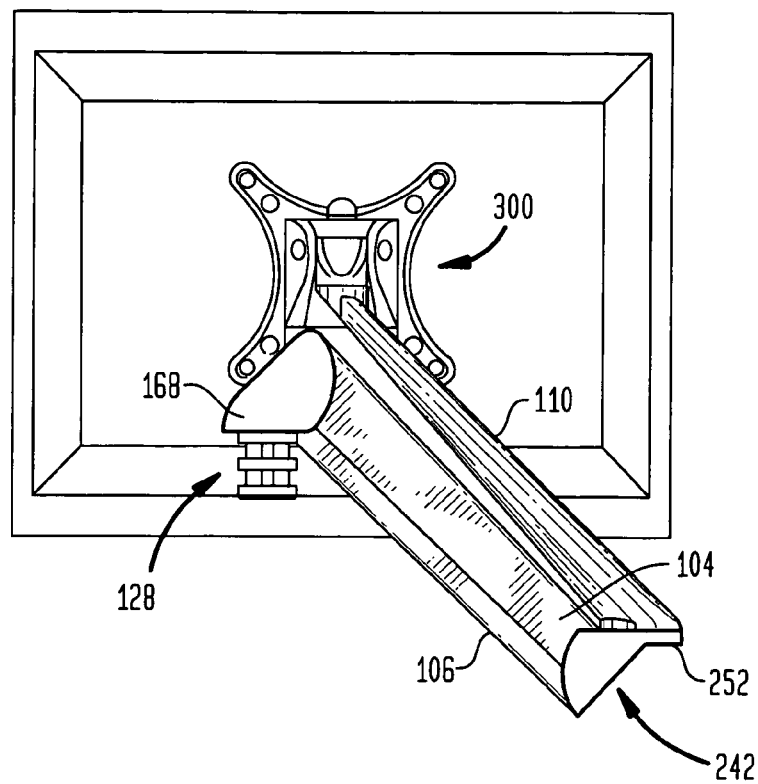
Figure 29F:
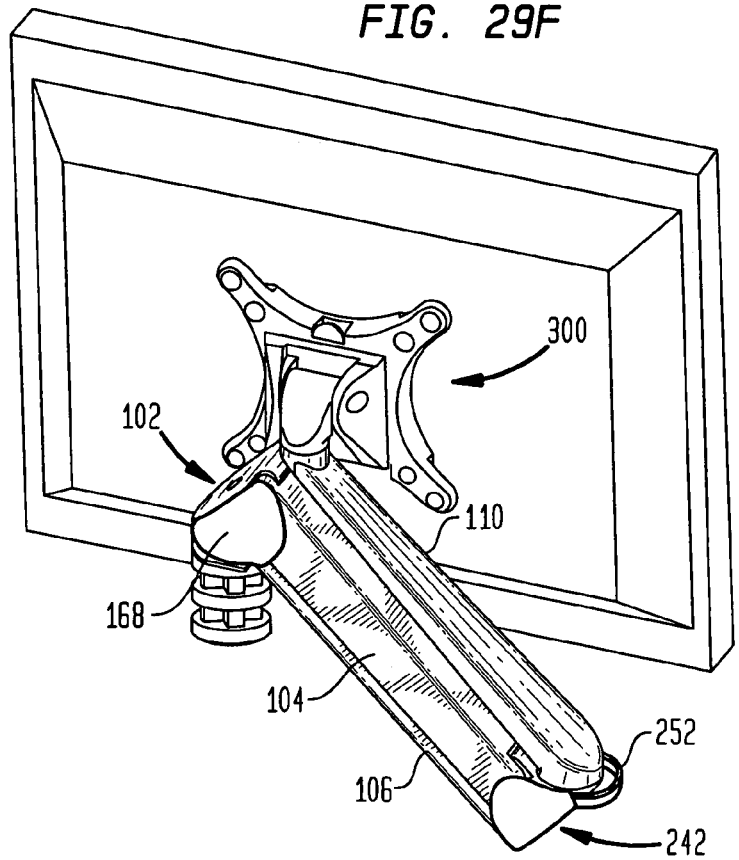

FIGS. 29A-F illustrate views of the extension arm 100 including the forearm extension 110, and show examples of how the upper and lower channels 104, 106 and the forearm extension 110 may be positioned. FIGS. 29A-B show the upper and lower channels 104, 106 and the forearm extension 110 in a fully extended and upward position. As seen in FIG. 29A, a second extended part 278 may be placed on the mounting cup 404 to provide cable management along with the extended part 252 projecting away from the second endcap 108. FIGS. 29C-D show the upper and lower channels 104, 106 in a downward position, while the forearm extension 110 is placed in an upward position. FIGS. 29E-F show the extension arm 100 in a folded position, wherein the forearm extension 110 is positioned over the upper channel 104. Of course, it should be understood that there are nearly limitless possibilities on how to position the different components of the extension arm 100, and that these figures are merely illustrative of a few positions that a user may select.

Novel clevis assemblies in accordance with aspects of the invention enable smaller gas springs to be used without sacrificing performance. Not only can the extension arm be made smaller, but performance and flexibility are greatly increased. The interlocking washer and shaft configuration prevents loose connections between rotatable components, and can be used in different locations on extension arms. In addition, the tapered channels and extension pieces provide sleek yet compact designs that are sturdy enough to handle heavy and bulky displays and other devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. By way of example only, while different embodiments described above illustrate specific features, it is within the scope of the present invention to combine or interchange different features among the various embodiments to create other variants. Any of the features in any of the embodiments can be combined or interchanged with any other features in any of the other embodiments.

The invention claimed is:

1. An adjustable support apparatus, comprising:
   a first endcap having a first section for connecting to a mount, a second section connected to the first section, and a clevis receiving member connected to one or both of the first and second sections, the first endcap having a longitudinal axis therealong and including a housing connecting the first and second sections, the clevis receiving member being disposed along an interior sidewall of the housing;
   a second endcap having first and second sections, the first section of the second endcap for supporting a user device and the second section of the second endcap being connected to the first section of the second endcap;
   a first channel having first and second ends, the first end of the first channel being connected to the second section of the first endcap, and the second end of the first channel being connected to the second section of the second endcap;
   a second channel having first and second ends, the first end of the second channel being connected to the second section of the first endcap, and the second end of the second channel being connected to the second section of the second endcap; and
   a clevis assembly including a clevis in operative engagement with the clevis receiving member of the first endcap and with a spring member coupled to the first channel;

wherein the clevis is adjustable along the clevis receiving member at a predetermined angle relative to the axis of the first endcap to change a compression state of the spring member, and wherein the clevis receiving member includes a surface having the predetermined angle sloping from the second section to the first section.

2. The adjustable support apparatus of claim 1, wherein the clevis assembly further comprises a rod in threaded engagement with the clevis, the rod being positioned at the predetermined angle relative to the axis of the first endcap.

3. The adjustable support apparatus of claim 1, wherein the predetermined angle is between 10° and 80°.

4. The adjustable support apparatus of claim 1, wherein the predetermined angle is between about 45° to 70°.

5. The adjustable support apparatus of claim 1, further comprising a first fastener having a first length and a pair of second fasteners each having a second length shorter than the first length, wherein the first end of the first channel connects to the second section of the first endcap with the first fastener and the first end of the second channel connects to the second section of the first endcap with the pair of second fasteners.

6. The adjustable support apparatus of claim 5, wherein the first endcap includes a housing connecting the first and second sections and the housing includes a pair of reinforcing members to support the pair of second fasteners therein.

7. The adjustable support apparatus of claim 1, further comprising at least one endcap cover, wherein the first endcap further includes a flange member connected to the first and second sections, and the at least one endcap cover is adapted to be placed adjacent to the flange member and cover a portion of the first endcap.

8. An adjustable support apparatus, comprising:
a first endcap having a first section for connecting to a mount, a second section connected to the first section, and a clevis receiving member connected to one or both of the first and second sections, the first endcap having a longitudinal axis therealong;
a second endcap having first and second sections, the first section of the second endcap for supporting a user device and the second section of the second endcap being connected to the first section of the second endcap;
a first channel having first and second ends, the first end of the first channel being connected to the second section of the first endcap, and the second end of the first channel being connected to the second section of the second endcap;
a second channel having first and second ends, the first end of the second channel being connected to the second section of the first endcap, and the second end of the second channel being connected to the second section of the second endcap; and
a clevis assembly including a clevis in operative engagement with the clevis receiving member of the first endcap and with a spring member coupled to the first channel;
wherein the clevis is adjustable along the clevis receiving member at a predetermined angle relative to the axis of the first endcap to change a compression state of the spring member, and wherein the first channel further includes an integrally molded connector having an angled receiving member for securing the spring member to the first channel.

9. The adjustable support apparatus of claim 8, further comprising a retaining cover connectable to the first channel, wherein the spring member is secured to the first channel between the retaining cover and the angled receiving member.

10. The adjustable support apparatus of claim 1, wherein the first channel further includes a reinforcement structure therein.

11. An adjustable support apparatus, comprising:
a first endcap having first and second ends and a longitudinal axis from the first end to the second end, the second end including means for mounting the adjustable support apparatus to a surface;
a second endcap having means for supporting a user device;
a first channel having first and second ends, the first end of the first channel being connected to the first end of the first endcap, and the second end of the first channel being connected to the second endcap;
a second channel having first and second ends, the first end of the second channel being connected to the first end of the first endcap, and the second end of the second channel being connected to the second endcap, the first and second channels defining a cavity for containing a spring mechanism therein; and
means for adjusting the spring mechanism, the means for adjusting being moveable along a path at a predetermined angle relative to the axis of the first endcap;
wherein the first channel further includes an integrally molded connector having an angled receiving member for securing the spring mechanism to the first channel.

12. An adjustment assembly for adjustably supporting a device with an extension and retraction mechanism, the adjustment assembly comprising:
a housing a first section for connecting to a mount and a second section connected to the first section, the housing having a longitudinal axis therealong and a clevis receiving member including a track positioned at an angle relative to the longitudinal axis, the clevis receiving member being disposed along an interior sidewall of the housing, and the track sloping along the angle from the second section to the first section;
a clevis having first and second ends, the first end having a surface for engaging the track and the second end having an opening therein for connecting the extension and retraction mechanism at a first end thereof; and
a channel apparatus having a first end connected to the housing and a second end connected to a second end of the extension and retraction mechanism;
wherein the clevis is adjustable along the track to change positioning of the extension and retraction mechanism.

13. The adjustment assembly of claim 12, further comprising:
a rod for threadedly adjusting the clevis along the track, the rod having a head at one end thereof, a tip remote from the head, and a threaded section disposed between the head and the tip; and
a retaining plate for securing the rod to an edge of the housing, the edge of the housing and the retaining plate including mating recesses defining a receptacle for receiving the tip of the rod therein.

14. The adjustment assembly of claim 12, wherein the clevis includes bottom and top surfaces that are substantially parallel to one another, and the opening of the clevis is positioned at a height at a midpoint between the bottom and top surfaces.

15. The adjustment assembly of claim 12, wherein the clevis includes bottom and top surfaces that are substantially parallel to one another, and the opening of the clevis is positioned at a height above a midpoint between the bottom and top surfaces.

16. The adjustment assembly of claim 15, wherein the second end of the clevis is angled upward.

17. The adjustment assembly of claim 12, wherein the clevis includes bottom and top surfaces that are substantially parallel to one another, and the opening of the clevis is positioned at a height below a midpoint between the bottom and top surfaces.

18. The adjustment assembly of claim 17, wherein the second end of the clevis is angled downward.

19. The adjustment assembly of claim 12, wherein the second end of the clevis includes a pair of spaced apart fastening members and the opening comprises a pair of aligned opening, a first one of the openings being positioned in a first one of the fastening members and a second one of the openings being positioned in a second one of the fastening members, and the clevis including a receptacle for threadedly adjusting the clevis along the track, wherein the angle of the track is a first angle relative to the longitudinal axis and the receptacle is positioned at a second angle relative to the longitudinal axis.

20. The adjustment assembly of claim 19, wherein the first and second angles are substantially equal.

* * * * *